(12) United States Patent
Goto et al.

(10) Patent No.: US 9,050,998 B2
(45) Date of Patent: Jun. 9, 2015

(54) VEHICLE TRAVEL CONTROL DEVICE

(75) Inventors: Takeshi Goto, Toyota (JP); Yoji Kunihiro, Susuno (JP); Junro Yamamoto, Susono (JP); Mitsuyuki Ouchi, Mishima (JP); Shuji Fujita, Miyoshi (JP); Keitaro Niki, Susono (JP); Tomihide Masuda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 13/703,558

(22) PCT Filed: Jun. 9, 2011

(86) PCT No.: PCT/JP2011/063759
§ 371 (c)(1),
(2), (4) Date: Dec. 11, 2012

(87) PCT Pub. No.: WO2011/155637
PCT Pub. Date: Dec. 15, 2011

(65) Prior Publication Data
US 2013/0096778 A1    Apr. 18, 2013

(30) Foreign Application Priority Data

Jun. 11, 2010    (JP) ................................. 2010-134119

(51) Int. Cl.
*B62D 6/00* (2006.01)
*B62D 5/00* (2006.01)

(52) U.S. Cl.
CPC ................ *B62D 6/002* (2013.01); *B62D 5/008* (2013.01)

(58) Field of Classification Search
CPC .. B62D 15/021; B62D 5/0463; B62D 5/0481; B62D 6/002; B62D 5/0475; B66F 9/07568; B60W 10/20; B60W 2540/18; B60W 2710/202; B60W 30/02

USPC ....................... 701/41, 42; 180/444
See application file for complete search history.

(56) References Cited

U.S. PATENT DOCUMENTS

| 5,448,487 A | 9/1995 | Arai |
| 5,648,901 A | 7/1997 | Gudat et al. |

(Continued)

FOREIGN PATENT DOCUMENTS

| DE | 10 2008 041 379 | 2/2010 |
| EP | 2 050 653 | 4/2009 |

(Continued)

OTHER PUBLICATIONS

Japanese Office Action issued Jun. 25, 2013, in Japan Patent Application No. 2010-134119.

(Continued)

*Primary Examiner* — Helal A Algahaim
*Assistant Examiner* — Michael Fouche
(74) *Attorney, Agent, or Firm* — Oblon, McClelland, Maier & Neustadt, L.L.P.

(57) ABSTRACT

A travel control device for a vehicle has a steered angle varying device 14 or a by-wire type steering device 96 which modifies a relationship of steered angle of steerable wheels to steering operation amount by a driver. When the control device decides that vehicle trajectory control is to be initiated or renewed, it calculates a target steered angle of the steerable wheels for driving the vehicle along a target trajectory which is required for the vehicle to arrive at a target arrival position in a target traveling direction on the basis of steering operation amount by a driver and vehicle speed at a time point of the decision. The control device controls the steered angle of the steerable wheels according to the target steered angle in feed-forward or feed-back manner.

15 Claims, 19 Drawing Sheets

(56) References Cited

U.S. PATENT DOCUMENTS

| | | | |
|---|---|---|---|
| 5,832,400 | A | 11/1998 | Takahashi et al. |
| 2002/0033300 | A1 | 3/2002 | Takeuchi et al. |
| 2003/0094329 | A1* | 5/2003 | Ogawa et al. .................. 180/444 |
| 2005/0043882 | A1 | 2/2005 | Takazawa |
| 2006/0030987 | A1* | 2/2006 | Akita .............................. 701/41 |
| 2008/0065292 | A1* | 3/2008 | Katrak et al. .................... 701/41 |
| 2009/0105907 | A1* | 4/2009 | Yamaguchi et al. ............. 701/41 |
| 2010/0025144 | A1 | 2/2010 | Huang et al. |
| 2011/0231095 | A1 | 9/2011 | Nakada et al. |
| 2013/0096778 | A1 | 4/2013 | Goto et al. |

FOREIGN PATENT DOCUMENTS

| | | | |
|---|---|---|---|
| JP | 06-300580 | A | 10/1994 |
| JP | 06-300581 | A | 10/1994 |
| JP | 8-198844 | | 8/1996 |
| JP | 11-198844 | A | 7/1999 |
| JP | 2001-48035 | A | 2/2001 |
| JP | 2004-038487 | A | 2/2004 |
| JP | 2004-314692 | A | 11/2004 |
| JP | 2005-70983 | | 3/2005 |
| JP | 2005-088806 | A | 4/2005 |
| JP | 2005-162153 | A | 6/2005 |
| JP | 2006-123597 | | 5/2006 |
| JP | 2007-269180 | A | 10/2007 |
| JP | 2008-59366 | A | 3/2008 |

OTHER PUBLICATIONS

International Search Report Issued Aug. 31, 2011 in PCT/JP11/063759 Filed Jun. 9, 2011.
Office Action issued on Sep. 8, 2014 in U.S. Appl. No. 14/006,240.
U.S. Office Action mailed MAy 15, 2014 in co-pending U.S. Appl. No. 14/006,240.
Advisory Action issued on Dec. 1, 2014 in U.S. Appl. No. 14/006,240.

* cited by examiner

VEHICLE TRAVEL CONTROL DEVICE

TECHNICAL FIELD

The present invention relates to a vehicle travel control device and, more particularly, to a vehicle travel control device which modifies steered angle of steerable wheels so that a vehicle travels along a target trajectory, i.e. a target travel line.

BACKGROUND ART

Conventionally, there have been proposed various types of vehicle travel control devices which control vehicle trajectory so that a vehicle travels along a target trajectory. For example, Japanese Patent Application Laid-Open (kokai) No. 2001-48035 discloses a lane keeping device which sets a target trajectory on the basis of lane information of a road in front of a vehicle and controls an automatic steering actuator so that a difference between a target trajectory and a point of regard of a driver in front of a vehicle.

According to the lane keeping device described in the reference, it is possible to promote a driver to make a steering operation or to modify steered angle of the steerable wheels so that a vehicle travels along a target trajectory by means of control of steering torque.

However, in the lane keeping device described in the reference, a vehicle exterior information acquisition means such as a camera is essential which acquires lane information of a road in front of a vehicle for setting a target trajectory and a point of regard of a driver in front of a vehicle corresponding to an actual trajectory. Since a target trajectory is fundamentally determined on the basis of lane information, a target trajectory can not always be set to a trajectory which a driver expects. In addition, under a situation where no lane information exists in front of a vehicle or no lane information can be acquired, a target trajectory can not be set and accordingly, a vehicle can not be driven along a target trajectory.

It is to be noted that Japanese Patent Application Laid-Open (kokai) No. 2007-269180 discloses a steering control device which sets a target trajectory on the basis of steering angle and vehicle speed and controls a steering transfer ratio so that a difference between a target trajectory and an actual trajectory of a vehicle decreases. According to the steering control device described in the reference, steered angle of the front wheels can be controlled so that a vehicle travels along a target trajectory.

However, in the steering control device described in the reference, a vehicle exterior information acquisition means such as a GPS for determining an actual trajectory is required. Since steered angle of the front wheels is controlled in a feed-back manner on the basis of a difference between a target trajectory and an actual trajectory, steered angle can not be controlled unless an actual trajectory has been determined and accordingly, a vehicle can not be controlled desirably along a target trajectory due to control delay.

DISCLOSURE OF THE INVENTION

A primary object of the present invention is to control steered angle of the front wheels with no delay sot that a vehicle trajectory conforms to a target trajectory without acquiring vehicle exterior information for determining a target trajectory and an actual trajectory of a vehicle.

The present invention provides a vehicle travel control device having a steered angle control means which changes a relationship of steered angle of steerable wheels to steering operation amount by a driver, wherein when the vehicle travel control device follows a predetermined procedure to decide that vehicle trajectory control is to be initiated or renewed, the device calculates a target steered angle of the steerable wheels for driving the vehicle along a target trajectory which is required for the vehicle to arrive at a target arrival position in a target traveling direction on the basis of steering operation amount by a driver and vehicle speed at a time point of the decision, and controls the steered angle of the steerable wheels by the steered angle control means according to the target steered angle.

As described in detail later, steering operation amount by a driver is related to a direction from present vehicle position to a target arrival position with reference to present vehicle traveling direction and vehicle speed is related to a distance from present vehicle position to a target arrival position. Steering operation amount by a driver is also related to a target vehicle traveling direction when the vehicle arrives at a target arrival position.

A time point when a decision that vehicle trajectory control is to be initiated or renewed is made following a predetermined procedure is referred to a reference time point. According to the above-described configuration, a target steered angle of the steerable wheels for driving the vehicle along a target trajectory which is required for the vehicle to arrive at a target arrival position in a target traveling direction is calculated on the basis of steering operation amount by a driver and vehicle speed at a reference time point and the steered angle of the steerable wheels is controlled according to the target steered angle.

Therefore, acquisition of vehicle exterior information for determining a target trajectory and an actual trajectory of a vehicle is not required. It is not required to determine an actual trajectory on the basis of vehicle exterior information nor to control steered angle of the front wheels in a feed-back manner on the basis of a difference between a target trajectory and an actual trajectory. Accordingly, it is possible to control steered angle of the front wheels with no delay so that a vehicle trajectory conforms to a target trajectory which a driver expects and to drive a vehicle along a target trajectory which a driver expects.

The above-mentioned configuration may be such that: the target trajectory is a exponential curve having an exponent including a variable of elapsed time since the time point of the decision on a hypothetical orthogonal coordinates having a time-related coordinate which is a straight line indicating the target traveling direction and a distance-related coordinate which is a perpendicular line dropped from a vehicle position at the time point of the decision to the time-related coordinate.

According to this configuration, target trajectory can be determined to a exponential curve having an exponent including a variable of elapsed time since the reference time point on a hypothetical orthogonal coordinates having a time-related coordinate which is a straight line indicating the target traveling direction and a distance-related coordinate which is a perpendicular line dropped from a vehicle position at the reference time point to the time-related coordinate.

The above-mentioned configuration may be such that: the target trajectory is an arc curve which has contact with a straight line indicating longitudinal direction of the vehicle at the time point of the decision at a position of the vehicle at the time point of the decision and has contact with a straight line indicating the target traveling direction at the target arrival position.

According to this configuration, target trajectory can be determined to an arc curve which has contact with a straight line indicating longitudinal direction of the vehicle at the reference time point at a position of the vehicle at the reference time point and has contact with a straight line indicating the target traveling direction at the target arrival position.

The above-mentioned configuration may be such that: the device modifies the steered angle of the steerable wheels so that a difference between the steered angle of the steerable wheels at the time point of the decision and the target steered angle decreases.

According to this configuration, the steered angle of the steerable wheels is modified so that a difference between the steered angle of the steerable wheels at the reference time point and the target steered angle decreases. Accordingly, the steered angle of the steerable wheels can efficiently be controlled in a feed-forward manner so that the steered angle of the steerable wheels conforms to the target steered angle and the steered angle of the steerable wheels can be controlled to the target steered angle without steering operation by a driver.

The above-mentioned configuration may be such that: the device modifies the steered angle of the steerable wheels so that a difference between actual steered angle of the steerable wheels and the target steered angle decreases.

According to this configuration, the steered angle of the steerable wheels is modified so that a difference between the steered angle of the steerable wheels at the reference time point and the target steered angle decreases. Accordingly, the steered angle of the steerable wheels can efficiently be controlled in a feed-back manner so that the steered angle of the steerable wheels conforms to the target steered angle and the steered angle of the steerable wheels can be controlled to the target steered angle even if steering operation is conducted by a driver.

It is to be noted that since feed-back control is executed on the steered angle of the steerable wheels, a delay in controlling the steered angle of the steerable wheels is far smaller as compared with a conventional vehicle travel control device in which feed-back control is executed on vehicle trajectory.

The above-mentioned configuration may be such that: the target arrival position is determined on the basis of steering operation amount by a driver and vehicle speed at the time point of the decision and the target traveling direction is determined on the basis of steering operation amount by a driver at the time point of the decision.

According to this configuration, the target arrival position can be determined on the basis of steering operation amount by a driver and vehicle speed at the reference time point and the target traveling direction can be determined on the basis of steering operation amount by a driver at the reference time point. Accordingly, a target trajectory which is required for the vehicle to arrive at a target arrival position in a target traveling direction can be determined on the basis of steering operation amount by a driver and vehicle speed at a reference time point.

The above-mentioned configuration may be such that: with an angle which is determined on the basis of steering operation amount by a driver at the time point of the decision being a reference angle, the target arrival position is on a straight line which is dropped from a position of the vehicle at the time point of the decision in a direction inclined at the reference angle relative to a longitudinal direction of the vehicle and the distance from a position of the vehicle at the time point of the decision to the target arrival position is a value which is dependent on vehicle speed.

According to this configuration, with an angle which is determined on the basis of steering operation amount by a driver at the reference time point being a reference angle, the target arrival position can be determined to a position which is on a straight line which is dropped from a position of the vehicle at the reference time point in a direction inclined at the reference angle relative to a longitudinal direction of the vehicle and is spaced from a position of the vehicle at the reference time point by a distance which is dependent on vehicle speed.

The above-mentioned configuration may be such that: with a straight line connecting a position of the vehicle at the time point of the decision and the target arrival position being a direction reference line, the target traveling direction is determined to a direction which is inclined at the reference angle relative to a direction reference line at the target arrival position.

According to this configuration, with a straight line connecting between a position of the vehicle at the time point of the decision and the target arrival position being a direction reference line, the target traveling direction can be determined to a direction which is inclined at the reference angle relative to a direction reference line at the target arrival position.

The above-mentioned configuration may be such that: the device decides that vehicle trajectory control is to be initiated when the magnitude of change rate of steering operation amount by a driver becomes lower than a second reference value for control initiation decision after the magnitude of change rate of steering operation amount by a driver exceeded a first reference value for control initiation decision under a situation where the trajectory control is not executed.

In general, when a driver alters course of a vehicle, he or she changes relatively rapidly steering operation amount and lessens the change of steering operation amount. Accordingly, necessity of initiation or renewal of vehicle trajectory control can be decided based on transition of the magnitude of change rate of steering operation amount.

According to the above configuration, when the magnitude of change rate of steering operation amount by a driver becomes lower than a second reference value for control initiation decision after the magnitude of change rate of steering operation amount by a driver exceeded a first reference value for control initiation decision under a situation where the trajectory control is not executed, by determining this situation, a decision can be made that vehicle trajectory control is to be initiated.

The above-mentioned configuration may be such that: the device decides that vehicle trajectory control is to be renewed when the magnitude of change rate of steering operation amount by a driver becomes lower than a second reference value for control initiation decision after the magnitude of change rate of steering operation amount by a driver exceeded a first reference value for control initiation decision under a situation where the trajectory control is executed.

According to this configuration, when the magnitude of change rate of steering operation amount by a driver becomes lower than a second reference value for control initiation decision after the magnitude of change rate of steering operation amount by a driver exceeded a first reference value for control initiation decision under a situation where the trajectory control is executed, by determining this situation, a decision can be made that vehicle trajectory control is to be renewed.

The above-mentioned configuration may be such that: with a distance from a position of the vehicle at the time point of the decision to the time-related coordinate being a reference distance, a target distance is calculated to a product of the reference distance and a natural exponential including a variable of elapsed time since the time point of the decision and the target trajectory is determined as a line connecting points which are at target distances from the time-related coordinate.

According to this configuration, a target distance can be calculated to a product of the reference distance and a natural exponential including a variable of elapsed time since the reference time point, and the target trajectory can be determined as a line connecting points which are at target distances from the time-related coordinate.

The above-mentioned configuration may be such that: with a general time being represented by $\Delta T$ which is necessary for a person to perceive a change of vehicle exterior visual information relevant to necessity of steering operation after the change occurred; Weber ratio being represented by $-k$; and a elapsed time since the time point of the decision being represented by t, the exponent of the natural exponential is $-(k/\Delta T)t$.

According to this configuration, since the exponent of the natural exponential is $-(k/\Delta T)t$, a target distance of a vehicle well-adapted to human perceptual property can be calculated, which enables to determine a target trajectory of a vehicle well-adapted to human perceptual property.

The above-mentioned configuration may be such that: the steered angle control means is of semi-by-wire type having a steering transfer ratio varying means which modifies the steered angle of the steerable wheels by virtue of actuating the steerable wheels relative to a steering input means operated by a driver and a control means which controls the steering transfer ratio varying means.

According to this configuration, in a vehicle having a steered angle control means of semi-by-wire type including a steering transfer ratio varying means, the steered angle of the steerable wheels can be controlled by virtue of varying a steering transfer ratio by the steering transfer ratio varying means.

The above-mentioned configuration may be such that: the vehicle has a steering assist force generation means which generates steering assist force for assisting steering operation by a driver and a steering assist force control means which controls the steering assist force generation means according to a target steering assist force for alleviating steering load of a driver, and the steering assist force control means, under a situation where the trajectory control is executed, estimates an amount of steering force change due to the control of the steered angle of the steerable wheels by the steered angle control means; corrects detected steering force with the amount of steering force change; calculates a steering assist force necessary to alleviate steering load of a driver on the basis of the corrected steering force; and sets the target steering assist force to a sum of the necessary steering assist force and the amount of steering force change.

According to this configuration, under a situation where the trajectory control is executed, an amount of steering force change due to the control of the steered angle of the steerable wheels by the steered angle control means is estimated and detected steering force is corrected with the amount of steering force change. A steering assist force necessary to alleviate steering load of a driver is calculated on the basis of the corrected steering force. Furthermore, the target steering assist force is set to a sum of the necessary steering assist force and the amount of steering force change and steering assist force generation means is controlled on the basis of the target steering assist force. Accordingly, in addition to alleviate steering load of a driver, he or she can be prevented from feeling odds due to unnatural change in steering force caused by steered angle control of the steerable wheels.

The above-mentioned configuration may be such that: steered angle control means is of by-wire type having a wheel-steer-drive means for varying steered angle of the steerable wheels, a detection means for detecting steering operation amount to a steering input means by a driver, and a control means for controlling the wheel-steer-drive means according to steering operation amount by a driver under a normal situation and controlling the wheel-steer-drive means as necessary independently of steering operation by a driver.

According to this configuration, in a vehicle having a steered angle control means of by-wire type, the steered angle of the steerable wheels can be controlled independently of steering operation by a driver by virtue of controlling the wheel-steer-drive means.

The above-mentioned configuration may be such that: the vehicle has a steering reaction force generation means which generates steering reaction force and a steering reaction force control means for controlling the steering reaction force generation means according to a target steering reaction force, and the steering reaction force control means calculates a basic steering reaction force which is not influenced by steered angle control of the steerable wheels by the steered angle control means on the basis of steering operation amount by a driver and calculates a target steering reaction force on the basis of a value which is derived by subtracting a basic steering force reducing amount for alleviating steering load of a driver from the basic steering reaction force.

According to this configuration, a basic steering reaction force is calculated which is not influenced by steered angle control of the steerable wheels by the steered angle control means on the basis of steering operation amount by a driver and a target steering reaction force is calculated on the basis of a value which is derived by subtracting a basic steering force reducing amount for alleviating steering load of a driver from the basic steering reaction force. The steering reaction force generation means is controlled according to the target steering reaction force. Accordingly, in addition to generate moderate steering reaction force, a driver can be prevented from feeling odds due to unnatural change in steering reaction force caused by steered angle control of the steerable wheels without calculating correction amount for removing the influence of steered angle control of the steerable wheels.

The above-mentioned configuration may be such that: the vehicle travel control device restrains the trajectory control when at least one of the steered angle control means and a means for attaining steering operation amount by a driver is not normal.

According to this configuration, a risk of improper control of trajectory can be reduced as compared with a situation where the trajectory control is not restrained when at least one of the steered angle control means and a means for attaining steering operation amount by a driver is not normal.

The above-mentioned configuration may be such that: the vehicle travel control device stores a relationship among steering operation amount by a driver, vehicle speed and target steered angle of the steerable wheels, and calculates a target steered angle of the steerable wheels from the relationship on the basis of steering operation amount by a driver and vehicle speed at a time point when a decision is made that vehicle trajectory control is to be initiated or renewed.

The above-mentioned configuration may be such that: the vehicle travel control device controls steered angle of the steerable wheels until a predetermined termination condition of the trajectory control is satisfied.

The above-mentioned configuration may be such that: the vehicle travel control device controls steered angle of the steerable wheels so that a predetermined steering transfer ratio is achieved when vehicle trajectory control is not to be initiated or renewed.

The above-mentioned configuration may be such that: the vehicle travel control device stores a relationship among elapsed time since a time point when a decision is made that vehicle trajectory control is to be initiated or renewed, steering operation amount by a driver, vehicle speed and target steered angle of the steerable wheels, and calculates a target steered angle of the steerable wheels from the relationship on the basis of elapsed time since a time point of the decision, steering operation amount by a driver and vehicle speed at the time point of the decision.

The above-mentioned configuration may be such that: the vehicle travel control device stores a relationship among steering operation amount by a driver, vehicle speed and target steered angle of the steerable wheels, and calculates a target steered angle of the steerable wheels from the relationship on the basis of steering operation amount by a driver and vehicle speed at a time point of the decision, independently of elapsed time since a time point of the decision.

The above-mentioned configuration may be such that: when at least one of steered angle control means and means for acquiring steering operation amount by a driver is not normal, the trajectory control is not executed.

The above-mentioned configuration may be such that: under a case where means for acquiring steering operation amount by a driver is not normal, when steering operation amount by a driver can be acquired by any other means, vehicle trajectory control is executed utilizing steering operation amount by a driver acquired by the other means.

MODE FOR CARRYING OUT THE INVENTION

Figure 1:
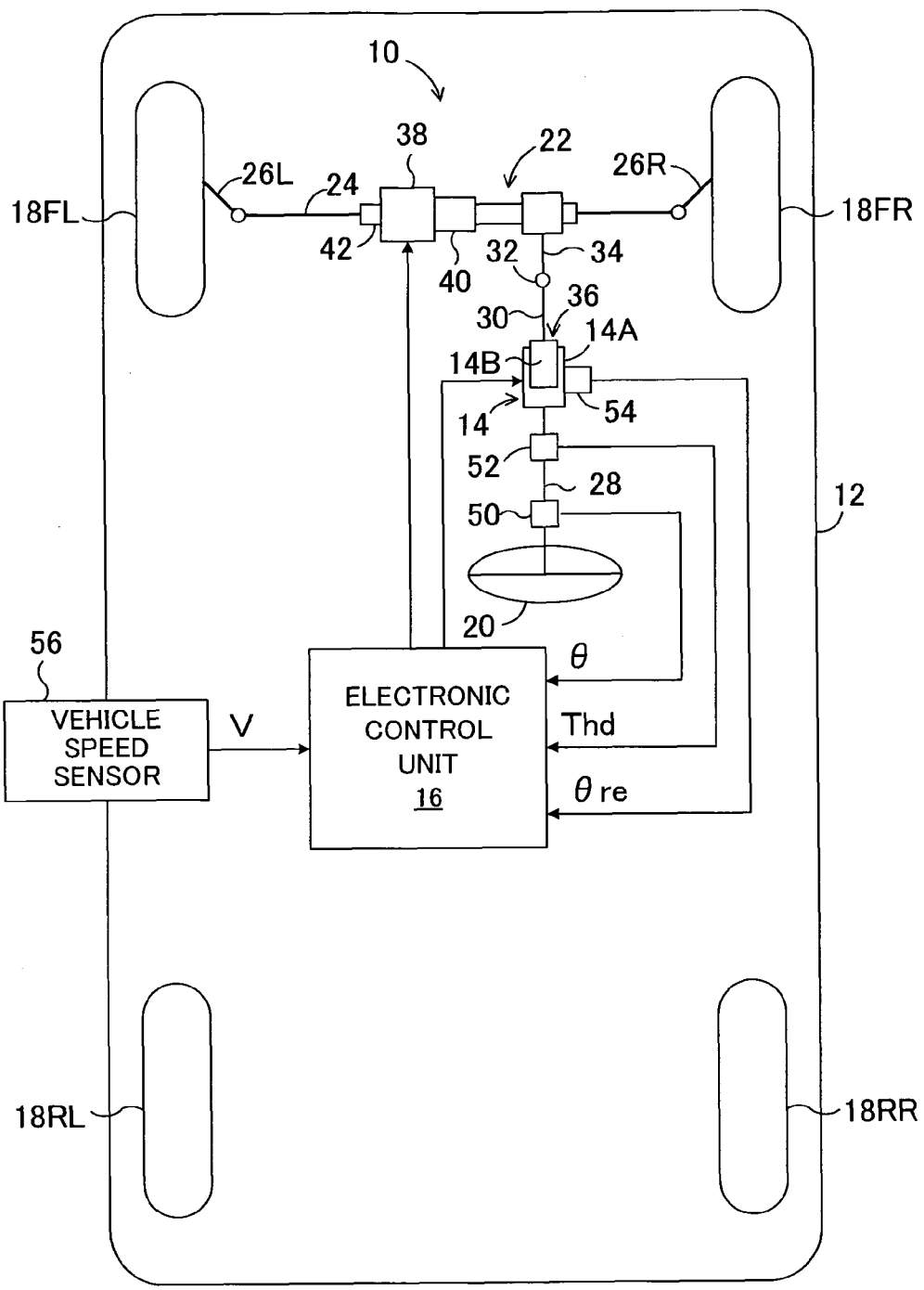
FIG. 1 is a schematic configurational view showing a first embodiment of a vehicle travel control device according to the present invention which is applied to a vehicle equipped with a steered angle varying unit and an electric power steering unit.

Prior to descriptions about specific embodiments, technical aspects common to individual embodiments will now be described panoptically.
1) Guide Rod Model Since intention of a driver with respect to vehicle trajectory can be deemed to reflect on steering operation amount by a driver, the direction of the front wheels which are steerable wheels, i.e. steered angle of the front wheels corresponds to direction of regard of a driver. With that, a two-wheel hypothetical vehicle is defined to have a guide rod mounted on front wheel, and a driver is assumed to drive a vehicle so that an apex of the guide rod moves along expected trajectory. In that case, a distance of regard of a driver in front of a vehicle, i.e. a distance from a vehicle to a position which a driver regards corresponds to a length of the guide rod and varies in accordance with vehicle speed.

In the present Description, the above-mentioned vehicle model having a hypothetical guide rod is referred to "guide rod model". According to the guide rod model, a preferred target trajectory can be set to a trajectory passing an apex of the guide rod on the basis of steering operation amount by a driver and vehicle speed at a time point when a driver changes a course of the vehicle.

Therefore, by virtue of controlling steered angle of front wheels so that a vehicle travels along set target trajectory, a vehicle can be travelled along a preferred target trajectory without acquiring vehicle exterior information by means of picturing of the surroundings, communication of the information from vehicle exterior site, or the like.

In order to make understanding of vehicle trajectory control based on guide rod model easier, a vehicle is deemed as a vehicle 104 of two-wheel model having a front wheel 100 and a rear wheel 102. Now we consider a situation where vehicle 104 change its course to a target course which is inclined by angle φ relative to a line 106 indicating longitudinal direction of the vehicle. The unit of angle is rad.

As shown in the figure, it is assumed that a hypothetical guide rod 110 sticks out in front of the vehicle from the center O of the front wheel 100 to a point P on the target course 108 along backward and forward direction of the front wheel and inclination angle of the guide rod 110 relative to longitudinal direction of the vehicle is referred to β. Length of the guide rod 110, i.e. the length of line segment OP is referred to A and angle which the target course 108 and the guide rod 110 make is referred to α. Distance from the center O of the front wheel 100 to the target trajectory 108 is referred to x and steered angle of the front wheel 100 is referred to δ(δ=β). In addition, wheel base of vehicle 104 is referred to WB and vehicle speed is referred to V. The unit of length is m and the unit of time is sec.

It is assumed that minute time dt has passed with no change of steered angle δ and vehicle speed V, and vehicle 104 moves from a position shown in solid line to a position shown in dotted line. The changes of angle φ and distance x are referred to dφ and dx, respectively, and then following equations 1-4 stand. It is to be understood that since minute time dt is very small, as shown in the figure, the front wheel 100 may be deemed to move to a point on the guide rod 110 and the rear wheel 102 may be deemed to move to a point on the line 106 indicating longitudinal direction of the vehicle.

$$\beta = \phi - \alpha \quad (1)$$

$$x = A^* \sin \alpha \quad (2)$$

$$-WBd\phi = Vdt^* \sin \beta \quad (3)$$

$$-dx = Vdt^* \sin \alpha \quad (4)$$

As the above-mentioned equation 2 is differentiated by a, the following equation 5 is obtained and dx is represented by the following equation 6.

$$dx/d\alpha = A^* \cos \alpha \quad (5)$$

$$dx = A^* \cos \alpha^* d\alpha \quad (6)$$

As equation 6 is substituted into the above-mentioned equation 4, the following equation 7 is obtained and the length A of the guide rod is represented by the following equation 8.

$$-A * \cos\alpha * d\alpha = Vdt * \sin\alpha \quad (7)$$

$$A = -(Vdt * \sin\alpha)/(\cos\alpha * d\alpha) \quad (8)$$
$$= -(Vdt * \tan\alpha)/d\alpha$$
$$= -Vdt * \{1/(\cos\alpha)^2\}$$

As the above-mentioned equation 3 is solved for Vdt, the following equation 9 is obtained and as the equation 9 is substituted into the equation 8, we have following equation 10.

$$Vdt = (-WBd\phi)/\sin \beta \quad (9)$$

$$A = -(-WBd\phi)/\sin \beta * \{1/(\cos \alpha)^2\} \quad (10)$$

Non straight travel such as turning of a vehicle can be considered as combinations of steady state circular travels and in the case where trajectory is arc, angles α and β are the same to each other. The angle β is the same as steered angle δ of the front wheel. Accordingly, rewriting angles α and β in the equation 10 to angle δ, the length A of the guide rod can be represented by the following equation 11.

$$A = (WBd\phi)/\sin \delta^* \{1/(\cos \delta)^2\} \quad (11)$$

The dφ in the equation 11 is raw rate YR of the vehicle and the latter is represented by the following equation 12.

$$YR = V/WB^* \delta \quad (12)$$

By substituting the equation 12 for dφ in the equation 11, the length A of the guide rod can be represented by the following equation 13.

$$A = WB(V/WB*\delta)/\sin\delta * \{1/(\cos\delta)^2\} \quad (13)$$
$$= (V*\delta)/\sin\delta * \{1/(\cos\delta)^2\}$$

It is to be noted that with the sign of steered angle δ varying according to the fact that the direction of turn is left or right, when the sign of steered angle δ is inversed due to the change of direction of vehicle turn, the sign of sin δ is also inversed. Accordingly, the length A of the guide rod is a positive value at all times.

In the above, with the center O of the front wheel 100 being a reference position, the guide rod medel is explained that the guide rod 110 sticks out in front of the vehicle from the reference position along backward and forward direction of the front wheel. However, it is preferred that vehicle trajectory is that of the gravity center of a vehicle and accordingly, in the description below, with the reference position being the position of the gravity center of a vehicle, guide rod is supposed to stick out in front of the vehicle from the reference position along backward and forward direction of the front wheel.

2) Circular Trajectory

Figure 19:
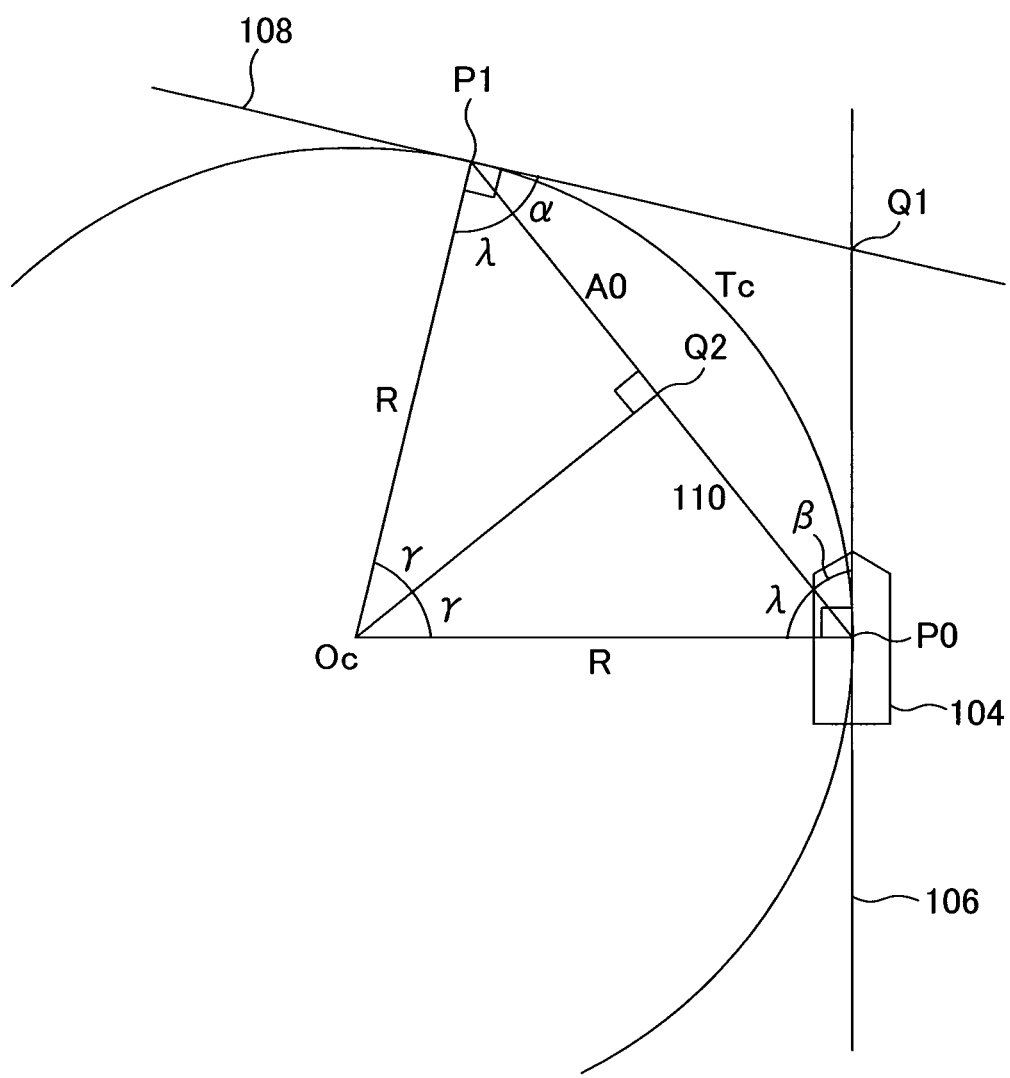
FIG. 19 is an explanatory view showing a situation where a vehicle turns in steady circular motion to make an arc trajectory.

As shown in FIG. 19, consider a situation where vehicle 104 travels in a steady circular turn motion with steered angle δ of the front wheel and vehicle speed being set to constant values respectively, and generates a circular trajectory Tc from position P0 to position P1. The line segment corresponding to the guide rod when the gravity center of the vehicle 104 is at the position P0 extends from the reference point P0 to the apex P1.

Since the motion of vehicle 104 is a steady circular turn motion, yaw rate YR of the vehicle is represented by the above-mentioned equation 12 and lateral acceleration LA of the vehicle is represented by the following equation 14.

$$LA = YR^*V \quad (14)$$

Accordingly, radius R of the circular trajectory Tc is represented by the following equation 15.

$$R = V^2/LA \quad (15)$$
$$= V^2/(YR*V)$$
$$= V/YR$$
$$= V/(V/WB*\delta)$$
$$= WB/\delta$$

As shown in FIG. 19, the line 106 indicating longitudinal direction of the vehicle and the line 108 indicating the target course are tangential lines which have contact with the circular trajectory Tc at the positions P0 and P1, respectively. An intersection of lines 106 and 108 is referred to Q1 and a foot of a perpendicular line which dropped from the center Oc of the circular trajectory Tc to the guide rod 110 is referred to Q2. Since a triangle P0OcP1 is an isosceles triangle having an apex at the center Oc, the angles P0OcQ2 and P1OcQ2 are the same to each other and the angles are referred to γ. The angles Oc P0Q2 and Oc P1 Q2 are the same to each other and the angles are referred to λ.

As shown in FIG. 19, the following equations 16 and 17 stand. Accordingly, the angle γ is the same as the angles α and δ.

$$\alpha + \lambda = \delta + \lambda = \pi/2 \tag{16}$$

$$\gamma + \lambda = \pi/2 \tag{17}$$

Again as shown in FIG. 19, the length A0 of the line segment corresponding to the guide rod is two times the line segment P0Q2 and the length of the line segment P0Q2 is $R*\sin \gamma = R*\sin \delta$. Accordingly, the length A0 of the line segment corresponding to the guide rod is represented by the following equation 18.

$$A0 = 2R*\sin\delta \tag{18}$$
$$= 2(WB/\delta)*\sin\delta$$

The length A0 of the line segment corresponding to the guide rod represented by the equation 18 does not include vehicle speed V and does not depend on vehicle speed V. By comparing the length A0 of the line segment and the length A of the guide rod represented by the equation 13, it is understood that unless the steered angle δ of the front wheel is modified, the vehicle can not travel along a circular trajectory passing the apex of the guide rod 110. That is, in order for the length A0 of the line segment to conform to a value the same as the length A of the guide rod represented by the equation 13, the steered angle of the front wheel must be modified to a value which is different from a steered angle δ (that is referred to "an original steered angle") determined by the steering operation amount by a driver and a steering gear ratio.

Figure 20:
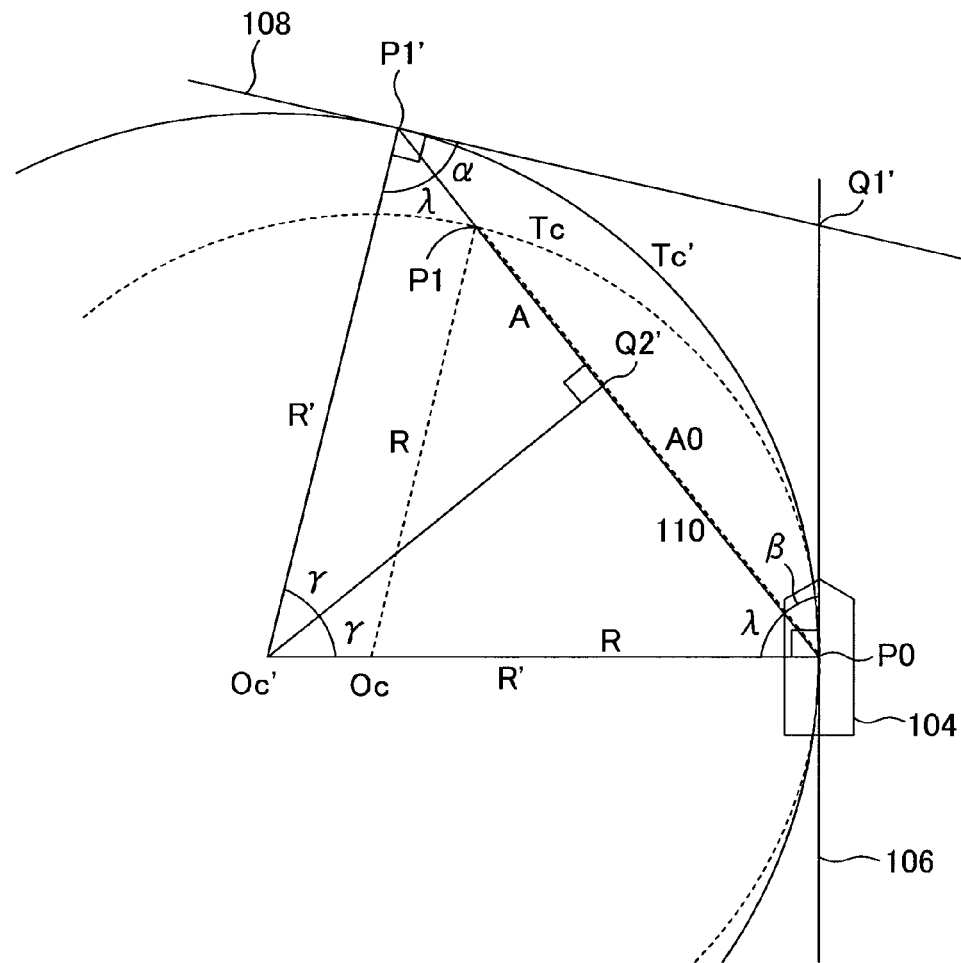
FIG. 20 is an explanatory view showing arc trajectorys of a vehicle turning in steady circular motion with respect to situations where steered angle of the front wheels is that corresponding to steering operation amount by a driver and that modified according to a guide rod model.

As shown in FIG. 20, it is assumed that when the steered angle of the front wheel is modified from the original steered angle δ to a modified steered angle δ', the vehicle 104 can travel along a circular trajectory Tc' passing the apex P1' of the guide rod 110. The center and radius of the circular trajectory Tc' are referred to Oc' and R', respectively.

The radius R' is represented by the following equation 19 corresponding to the equation 15.

$$R' = WB/\delta' \tag{19}$$

As triangles P0P1Oc and P0P1'Oc' are like figures, the following equation 20 stands.

$$R/R' = A0/A \tag{20}$$

Substituting the equations 13, 15, 18 and 19 in the equation 20, we have the following equation 21.

$$\delta'/\delta = 2WB*\sin \delta'*\sin \delta*(\cos \delta')^2/(V*\delta'*\delta) \tag{21}$$

Under a situation where steered angle δ and modified steered angle δ' are small, sin δ and sin δ' can be deemed to be δ and δ', respectively and cos δ' can be deemed to be 1. Accordingly, modified steered angle δ' is represented by the following equation 22.

$$\delta' = (2WB/V)*\delta \tag{22}$$

Steering angle which can be deemed as steering operation amount by a driver is referred to θ and steering gear ratio is referred to N. Then the steered angle δ of the front wheel is represented by the following equation 23. It is to be noted that steering gear ratio N may be constant or a value variably set according to vehicle speed V, for example.

$$\delta = \theta/N \tag{23}$$

Thus, modified steered angle δ' is represented by the following equation 24.

$$\delta' = (2WB/V)*\theta/N \tag{24}$$

A time is referred to Ta which is required for vehicle to travel along the circular trajectory Tc' from the position P0 to the position P1' with the steered angle of the front wheel and vehicle speed being kept to constant values δ' and V, respectively. The time Ta is a time required for vehicle to make a circular motion along the circular arc of a sector having central angle of 2γ=2δ and radius R' at yaw rate YR represented by the following equation 25. Accordingly, as is represented by the equation 26, the time Ta is 1 [sec] and does not depend on vehicle speed V.

$$YR = V/WB*\delta' \tag{25}$$

$$Ta = 2\delta/YR \tag{26}$$
$$= 2WB*\delta/(V*\delta')$$
$$= 2WB*\delta/\{V*(2WB/V)*\delta\}$$
$$= 1$$

Therefore, under a situation where the original steered angle of the front wheel is δ, by keeping vehicle speed V constant and setting a target steered angle δat to modified steered angle δ' to control steered angle of the front wheel, the vehicle can travel along a circular trajectory Tc' passing the apex of the guide rod 110. The vehicle passes position P1' irrespective of vehicle speed V when the time Ta=1 [sec] elapses.

3) Exponential Trajectory

From the equation 2, the following equation 27 stands. It is to be noted that from the equation 1, α=φ−β

$$x' = -V*\sin \alpha \tag{27}$$

From the equations 2 and 27, the following equation 28 stands. The equation 28 shows that the distance x is a variable which varies according to Weber's law.

$$x' = -(V/A)x \tag{28}$$

Solving the equation 28, the following equation 29 is obtained. Controlling the distance x to vary in accordance with the equation 29 makes it possible to control the distance x according to Weber's law. It is to be noted that xo is the distance x when time t is 0.

$$x = x_0 * \exp\{-(V/A)*t\} \tag{29}$$

Next, consider adaptation of the control of the distance x according to the equation 29 to perception property of human being. As sown in FIG. 21, under a situation where horizontal acceleration x" increases which is a second order differential value of the distance x, a minimum value of the change of horizontal acceleration x" which a person can perceive is referred to Δx". A minimum time which is required for a person to perceive the change Δx" of horizontal acceleration x" is referred to ΔT. A change rate of horizontal acceleration x" is referred to x'". Then the minimum value Δx" is represented by the following equation 30.

$$\Delta x'' = x''' * \Delta T \quad (30)$$

Figure 21:
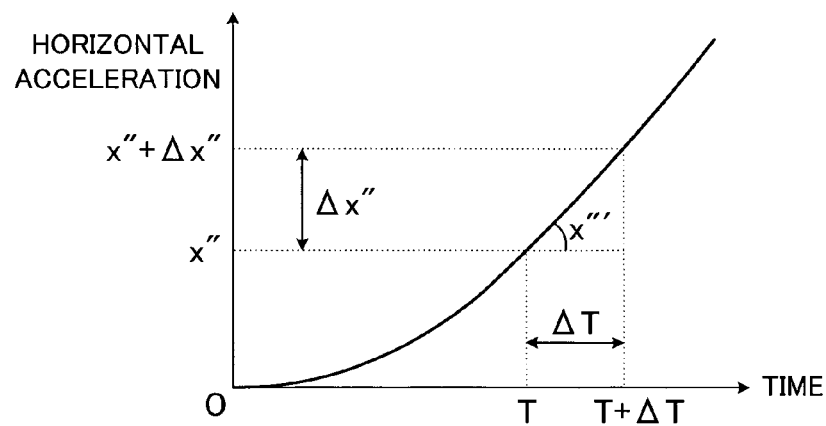
FIG. 21 is an explanatory view showing a minimum value $\Delta x''$ of change in horizontal acceleration $x''$ which a person can perceive and a minimum time $\Delta T$ which a person requires to perceive a change of the minimum value $\Delta x''$ under a situation where horizontal acceleration $x''$ changes.

As is understood from FIG. 21, the change rate x''' of horizontal acceleration x'' is represented by the following equation 31.

$$x''' = \{(x'' + \Delta x'') - x''\}/\{(T + \Delta T) - T\}$$
$$= \Delta x''/\Delta T \quad (31)$$

Differentiating the equation 28 by second order differential, the following equation 32 is obtained and the following equation 33 stands.

$$x''' = -(V/A) * x'' \quad (32)$$

$$x'''/x'' = -(V/A) \quad (33)$$

Substituting the equation 31 in the equation 33 and deforming the result, we have the following equation 34.

$$\Delta x''/x'' = -(V/A) * \Delta T \quad (34)$$

Since the equation 34 has a form of Weber's law, with Weber's ratio being referred to −k, the equation 34 can be rewritten to the following equation 35. In this regard, however, k is a positive value represented by equation 36.

$$\Delta x''/x'' = -k \quad (35)$$

$$k = (V/A) * \Delta T \quad (36)$$

Although the minimum value Δx'' is different among individuals, it is assumed that the minimum value Δx'' is a averaged constant value and Weber's ratio −k is a constant value.

Deforming the equation 35 to the following equation 37 and substituting the equation 37 in the equation 30 to deform the result, the following equation 38 is obtained. Solving the equation 38, we have the following equation 39.

$$\Delta x'' = -k * x'' \quad (37)$$

$$x''' * \Delta T = -k * x'' \quad (38)$$

$$x = x_0 * \exp\{-(k/\Delta T) * t\} \quad (39)$$

While both the equations 29 and 39 show that the distance x is a exponential function of time t, by the equation 39, the distance x, i.e. preferred exponential trajectory of vehicle can be expressed with Weber's ratio −k and minimum time ΔT which are not depend on vehicle speed V.

Thus, controlling vehicle trajectory using the equation 39 yields the following advantages as compared with a case where vehicle trajectory is controlled using the equation 29.

1) As the equation does not include vehicle speed V, calculation amount can be reduced and the control can be simplified.

2) Vehicle trajectory can be controlled to a preferred target trajectory adapted to perception property of human being.

As is understood from the above, by controlling the distance x using the equation 39 to control vehicle trajectory, the latter can be controlled to a preferred exponential trajectory adapted to perception property of human being.

However, even if vehicle trajectory is controlled according to the equation 39 to a preferred exponential trajectory, a time Tb which is required for vehicle to arrive at the position P1' do not always conform to the same value as the time Ta which is the required time in a case where vehicle trajectory is arc.

Consequently, with a correction coefficient being referred to D which serves to conform the time Tb to the same value as the time Ta, the equation 39 is rewritten to the following equation 40.

$$x = x_0 * \exp\{-(k/\Delta T) D * t\} \quad (40)$$

In order to conform the time Tb which is required for vehicle to arrive at the position P1' to the time Ta, with xb being a small positive constant near to 0, it is enough that the distance x become xb when the time t in the equation 40 is Ta and accordingly, the following equation 41 stands. As Ta is 1 [sec], solving the equation 41 for correction coefficient D, the following equation 42 is obtained.

$$Xb = x_0 * \exp\{-(k/\Delta T) D * Ta\} \quad (41)$$

$$D = -(\log_e xb - \log_e x_0) * \Delta T / (k * Ta)$$
$$= -(\log_e xb - \log_e x_0) * \Delta T / k \quad (42)$$

Figure 22:
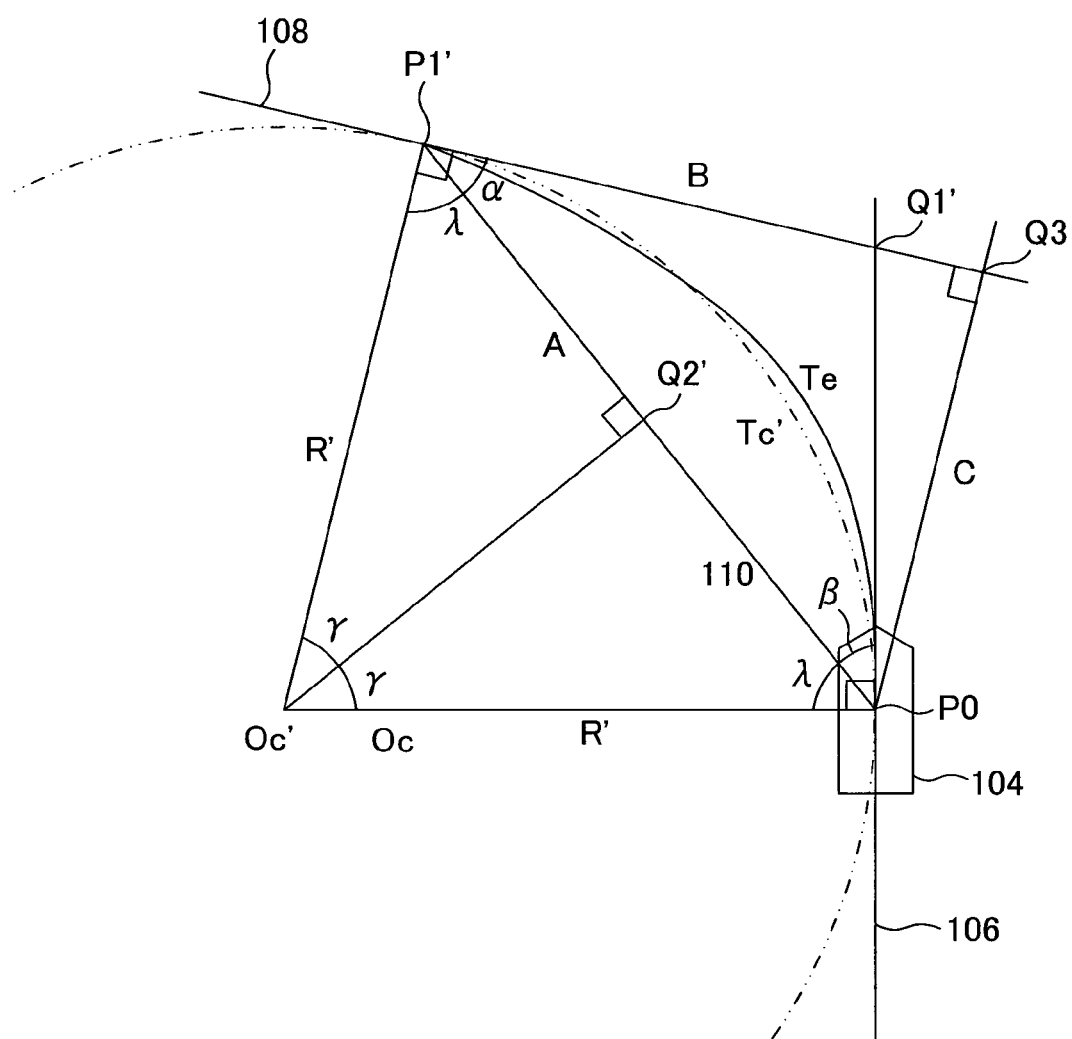
FIG. 22 is an explanatory view showing a situation where a vehicle travels making an exponential trajectory from a reference position of a guide rod to an apex position of the guide rod.

As shown in FIG. 22, consider a situation where vehicle travels generating exponential trajectory Te from the reference position P0 to the apex position P1' of the guide rod by controlling the steered angle δ so that the distance x varies according to the equation 40.

The foot of a perpendicular line dropped from the reference position P0 of the guide rod to the line 108 indicating a target course is referred to an intersection Q3. The exponential function represented by the equation 40 is a function on an orthogonal coordinates having a time-related coordinate which is the line 108 indicating target course, coordinate relating to a distance x which is a perpendicular line dropped from a vehicle position to the time coordinate, and a coordinate origin which is at the intersection Q3.

The distances between the position P1 and the intersection Q3 and between the position P0 and the intersection Q3 are referred to B and C, respectively. Then the distances B and C are represented by the following equation 43 and 44, respectively.

$$B = A * \cos\delta \quad (43)$$

$$C = A * \sin\delta$$
$$= 2R * \sin\delta * \sin\delta$$
$$= 2(WB/\delta') * (\sin\delta)^2 \quad (44)$$

Since when steered angle δ is small, sin δ can be deemed to be equal to δ, by substituting the equation 22 in the equation 44 and rewriting sin δ to δ, the distance C is represented by the following equation 45. The distance C is xo of the distance x when time t is 0 and is a positive value. Accordingly, the distance xo can be calculated by the following equation 46 corresponding to the equation 45.

$$C = (V/\delta) * \delta^2$$
$$= V * \delta \quad (45)$$

$$xo = V * |\delta| \quad (46)$$

Therefore, by calculating correction coefficient D and distance xo by the equations 42 and 46, respectively and controlling the distance x according to the equation 40, vehicle can travel along exponential trajectory Te so that the vehicle substantially reaches the position P1' when the time Ta=1 [sec] elapses.

Next, steered angle control will be explained which may be executed to control vehicle trajectory to a preferred exponential trajectory Te by making the distance x to vary according to the equations 40, 42 and 46.

First, consider lateral acceleration LAa of vehicle under a situation where steered angle δ of the front wheel and vehicle speed V is set to a constant δ and a constant value, respectively and vehicle travels generating arc trajectory Tc' from the reference position P0 to the apex position P1' of the guide rod. Slip angle of vehicle is assumed to be 0. Then, as lateral acceleration LAa of vehicle is equal to a product of yaw rate YR represented by the equation 25 and vehicle speed V, it is calculated by the following equation 47.

$$LAa = YR * V \qquad (47)$$
$$= V/WB * \delta' * V$$
$$= V^2/WB * \delta'$$
$$= V^2/WB * (2WB/V) * \theta/N$$
$$= 2V * \theta/N$$

Next, consider lateral acceleration LAb of vehicle under a situation where with vehicle speed V being set to a constant value and steered angle δ of the front wheel being variably set to δb, vehicle travels generating exponential trajectory Te from the reference position P0 to the apex position P1' of the guide rod.

Figure 23:
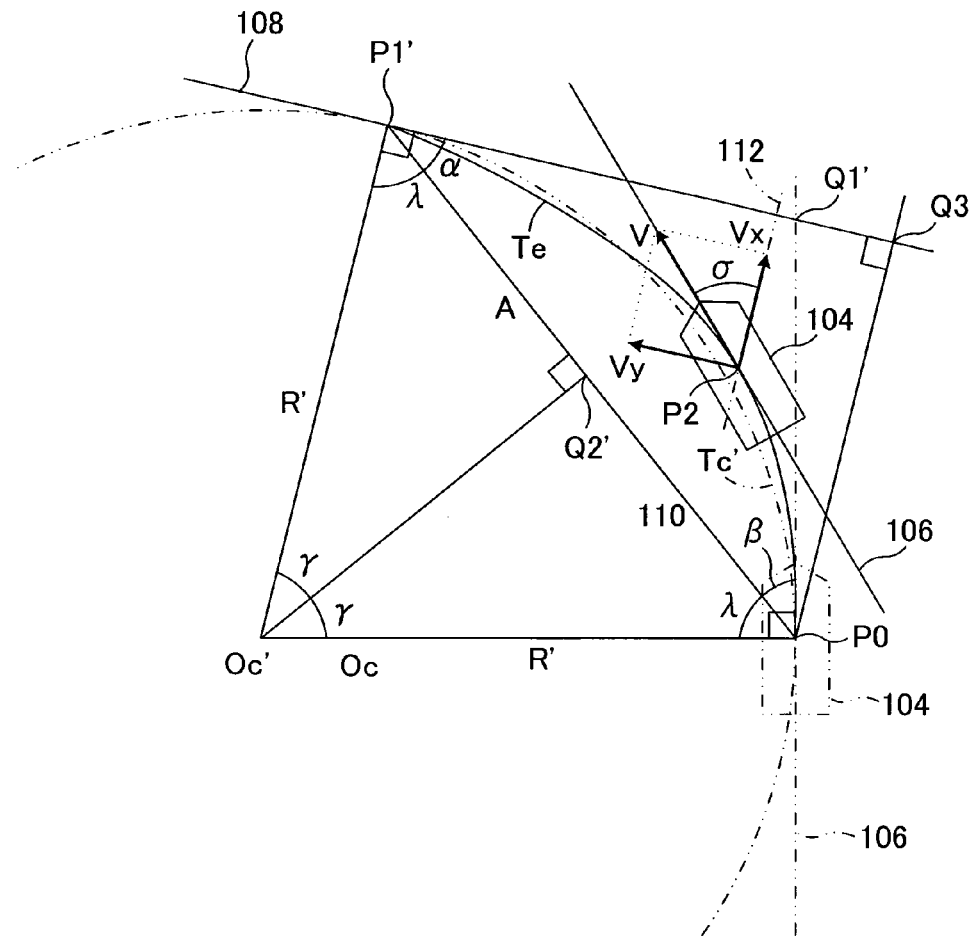
FIG. 23 is an explanatory view showing a situation where a vehicle moves to a position between a reference position of a guide rod and an apex position of the guide rod when the vehicle travels making an exponential trajectory.
Figure 24:
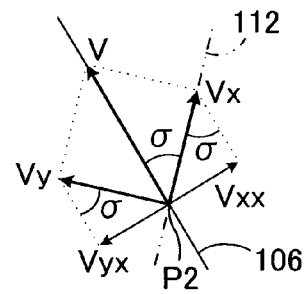
FIG. 24 is an explanatory view showing components of vehicle speed which are resolved into those parallel to distance-related coordinate and time-related coordinate with respect to the situation shown in FIG. 23.

As shown in FIGS. 23 and 24, with respect to a situation where vehicle has moved to a position between the reference position P0 and the apex position P1', resolving vehicle speed V into a component Vx parallel to the coordinate relating to the distance x and a component Vy parallel to the time-related coordinate, the following equation 48 stands.

$$V = (Vx^2 + Vy^2)^{1/2} \qquad (48)$$

As the component Vx parallel to the coordinate relating to the distance x is equal to change rate of the distance represented by the equation 40, it can be calculated by the following equation 49.

$$Vx = dx/dt \qquad (49)$$
$$= |d[x_0 * \exp\{-(k/\Delta T)D * t\}]/dt|$$
$$= |-V * \delta * (k/\Delta T * D) * \exp\{-(k/\Delta T)D * t\}|$$

From the equations 48 and 49, it is understood that the component Vy parallel to the time-related coordinate can be calculated by the following equation 50.

$$Vy = (V^2 - Vx^2)^{1/2} \qquad (50)$$

As shown in FIG. 24, an angle which the line 106 indicating longitudinal direction of the vehicle forms with a line 112 parallel to the coordinate relating to the distance x is referred to σ, the angle being formed by the component Vx parallel to the coordinate relating to the distance x with vehicle speed V. Vehicle slip angle is assumed to be 0, and then the following equation 51 stands. Accordingly, the angle σ is represented by the following equation 52.

$$\tan \sigma = Vy/Vx \qquad (51)$$

$$\sigma = \tan^{-1}(Vy/Vx) \qquad (52)$$

Vehicle lateral component of the component Vx parallel to the coordinate relating to the distance x is referred to Vxx and Vehicle lateral component of the component Vy parallel to the time-related coordinate is referred to Vyx. The vehicle lateral components Vxx and Vyx are represented by the following equations 53 and 54, respectively.

$$Vxx = Vx * \sin \sigma \qquad (53)$$

$$Vyx = Vy * \cos \sigma \qquad (54)$$

Vehicle lateral speed Vz and vehicle lateral acceleration LAb under a situation where vehicle travels generating exponential trajectory Te are represented by the following equations 55 and 56, respectively.

$$Vz = Vyx - Vxx \qquad (55)$$
$$= Vy * \cos \sigma - Vx * \sin \sigma$$

$$LAb = d(Vz)/dt \qquad (56)$$

A difference is represented by the following equation 57 which is between vehicle lateral acceleration LAb under a situation where vehicle travels generating exponential trajectory Te and lateral acceleration LAa under a situation where vehicle travels generating arc trajectory Tc.

$$\Delta LA = LAb - LAa \qquad (57)$$

Yaw rate YR is a value calculated by the equation 25 whose δ' is replace by δb and is as well a value of vehicle lateral acceleration LAb divided by vehicle speed V. Accordingly, the following equation 58 stands.

$$V/WB * \delta b = LAb/V \qquad (58)$$

Therefore, the steered angle of the front wheel for driving a vehicle to generate exponential trajectory Te is calculated by the following equation 59.

$$\delta b = (LAb/V)/(V/WB) \qquad (59)$$
$$= (WB/V^2) * LAb$$

Modification amount of steered angle of the front wheel is referred to Δδb which is required to drive a vehicle to generate exponential trajectory Te with reference to the steered angle δa (target steered angle δat=δ') for driving a vehicle to generate arc trajectory Tc'. With a value during left turn being assumed to be positive, modification amount Δδb of steered angle of the front wheel is calculated by the following equation 60 during left turn while it is calculated by the following equation 61 during right turn.

$$\Delta \delta b = (WB/V^2) * \Delta LA \qquad (60)$$

$$\Delta \delta b = -(WB/V^2) * \Delta LA \qquad (61)$$

The steered angle δa for driving a vehicle to generate arc trajectory Tc' is the modified steered angle δ' represented by the equation 24. Accordingly, the steered angle δbt for driving a vehicle to generate exponential trajectory Te is calculated by the following equation 62 during left turn while it is calculated by the following equation 63 during right turn.

$$\delta bt = \delta' + \Delta\delta b \quad (62)$$
$$= (2WB/V) * \theta/N + (WB/V^2) * \Delta LA$$

$$\delta bt = \delta' + \Delta\delta b \quad (63)$$
$$= (2WB/V) * \theta/N - (WB/V^2) * \Delta LA$$

4) Control Manner of Steered Angle of Front Wheel

As is apparent from the above, by controlling steered angle δ of the front wheel according to target steered angle δat set to δ' represented by the equation 24, vehicle can travel so that it generates arc trajectory Tc'. By controlling steered angle δ of the front wheel according to target steered angle δbt calculated by the equation 62 or 63, vehicle cane travel so that it generates exponential trajectory Te.

In both cases where target steered angle of the front wheel is δat and it is δbt, both feed—forward control and feed-back control can be executed to control steered angle δ of the front wheel to target steered angle and they have their own advantage.

Feed-forward control is a control in which target steered angle is calculated when a decision is made that trajectory control is to be initiated (time point of control initiation) and steered angle of the front wheel is controlled to target steered angle on the premise that steered angle of the front wheel is not altered much after the control was initiated.

Since in a feed-forward control, vehicle trajectory can be controlled to a target trajectory even if no steering operation is conducted by a driver, the control is suited for a driver having lower learning level with respect to vehicle driving rather than a driver having higher learning level.

To the contrary, feed-back control is a control in which target steered angle is calculated when trajectory control is initiated and steered angle of the front wheel is controlled to target steered angle by reducing a difference between actual steered angle and target angle on the premise that steered angle of the front wheel may be altered after the control was initiated.

Since in a feed-back control, vehicle trajectory can be controlled to a target trajectory even if steering operation is conducted by a driver, the control is suited for a driver having higher learning level with respect to vehicle driving rather than a driver having lower learning level.

It is to be understood that in both cases where the manner to control steered angle δ of the front wheel to target steered angle is a feed-forward control and it is a feed-back control, when a predetermined renewal condition of trajectory control is satisfied, target trajectory is renewed to renew trajectory control.

5) Control Device of Steered Angle of Front Wheel

In order to control vehicle trajectory to target trajectory, a steered angle control device is required which is able to modify steered angle of the front wheels by driving the front wheel to steer independently of steering operation by a driver to control steered angle to target steered angle.

There are two types of such steered angle control devices. One is a mechanical steered angle control device in which a steering input means such as a steering wheel and the front wheels serving as steerable wheels are mechanically connected with each other and the other is a non-mechanical steered angle control device in which a steering input means and the front wheels are not mechanically connected with each other.

Mechanical steered angle control device is adapted to actuate front wheels to steer relative to a steering input means by an actuator. An example for this is a steering device of semi-steer-by—wire type equipped with a variable gear ratio steering device (VGRS).

Non-mechanical steered angle control device is a device in which a steering input means and an actuator for actuating front wheels to steer are independent from each other. An example for this is a steering device of steer-by-wire type.

6) Classification of Trajectory Control and Embodiments

As is apparent from the above, the trajectory control of the present invention can be classified into controls 1-4 according to whether trajectory is arc or exponential and whether steered angle control is feed-forward (FF) control or feed-back (FB) control. Each of the controls 1-4 can be classified into two types according to whether steered angle control device a mechanical steered angle control device or a non-mechanical steered angle control device.

First to eighth embodiments described later are classified as shown in the following Tables 1 and 2 according to the above classification items. It is to be noted that Tables 1 and 2 show embodiments whose steered angle control devices are a mechanical steered angle control device and a non-mechanical steered angle control device, respectively.

TABLE 1

(Steered angle control device is mechanical)

| Control of steered angle | Target trajectory | |
|---|---|---|
| | Arc | Exponential |
| FF control | Control 1 (First embodiment) | Control 3 (Third embodiment) |
| FB control | Control 2 (Second embodiment) | Control 4 (Fourth embodiment) |

TABLE 2

(Steered angle control device is non-mechanical)

| Control of steered angle | Target trajectory | |
|---|---|---|
| | Arc | Exponential |
| FF control | Control 1 (Fifth embodiment) | Control 3 (Seventh embodiment) |
| FB control | Control 2 (Sixth embodiment) | Control 4 (Eighth embodiment) |

It is to be understood that in any of the under-described first to eighth embodiments, trajectory control is not executed under a situation where any other vehicle travel control such as anti-skid control is conducted. When initiation condition of any other vehicle travel control such as anti-skid control is satisfied under a situation where trajectory control is executed, it is terminated and such other vehicle travel control is initiated.

7) Steering Reaction Force Control in Mechanical Steered Angle Control Device

There are two types of control methods for controlling steering reaction force by power assist. One is a first method which do not detect steering torque and the other is a second method which detects steering torque.

7-1) First Method

Turn radius R of a vehicle running in steady circular turn is represented by the equation 15. A curvature of vehicle trajectory is referred to ρ, curvature is represented by the following equation 64.

$$R = 1/\rho \quad (64)$$

Accordingly, steered angle δ of the front wheels is represented by the following equation 65.

$$\delta = WB/R \quad (65)$$
$$= \rho * WB$$

A sum of a caster trail and pneumatic trail of front wheel is referred to Lt [m] and cornering power of front wheels is referred to Kf [Nm/rad]. Torque about a king pin of front wheels is represented by the following equation 66.

$$Ts = -2Lt*Kf*\delta \quad (66)$$

Torque at steering wheel serving as steering input means, i.e. steering torque is referred to Th. Then, torque Ts about a king pin of front wheels is represented by the following equation 67 using steering gear ratio N (refer to the equation 23).

$$Ts = Th*N \quad (67)$$

From the equations 66 and 67, the following equation 68 stands. Accordingly, steering torque Th is represented by the following equation 69.

$$Th*N = -2Lt*Kf*\delta \quad (68)$$

$$Th = -2Lt*Kf*\delta/N \quad (69)$$

The above equation 69 shows the relationship between steered angle δ of front wheels and steering torque Th when steering torque is not reduced by power assist. Substituting the equation 23 in the equation 69, the following equation 70 is obtained. Tht represented by the equation 70 is a steering torque when steered angle of front wheels is the original steered angle δ, i.e. a steering torque when steered angle is not modified by the trajectory control.

$$Tht = -2Lt*Kf*\theta/N^2 \quad (70)$$

With steering torque Tht represented by the equation 70 being referred to a reference torque and steering torque detected by for example a torque sensor being referred to Thd, steering torque difference ΔTh represented by the following equation 71 shows fluctuation component of steering torque due to modification of steered angle of front wheels.

$$\Delta Th = Thd - Tht \quad (71)$$

Accordingly, steering torque which is derived by removing fluctuation component ΔTh of steering torque due to modification of steered angle of front wheels from steering torque Thd, i.e. steering torque Th0 which does not include fluctuation component of steering torque due to modification of steered angle of front wheels is represented by the following equation 72.

$$Th0 = Thd - \Delta Th \quad (72)$$
$$= Tht$$
$$= -2Lt*Kf*\theta/N^2$$

Therefore, by means of setting steering torque Th0 represented by the equation 72 to modified detected steering angle and calculating target assist torque Tpat on the basis of the set steering torque, steering load of a driver can be alleviated without being affected by steering torque fluctuation due to modification of steered angle of front wheels. It is to be noted that target assist torque Tpat may be calculated on the basis of modified detected steering torque Th0 and vehicle speed V so that it increases as the magnitude of modified detected steering torque Th0 increases and it decreases as vehicle speed V increases.

7-2) Second Method 7-2-1) Circular Target Trajectory

As described above, when target trajectory is arc, steered angle of front wheels is controlled to target steered angle δat=δ' under a situation where it is to be an original steered angle δ. Accordingly, steering torque That when steered angle of front wheels is target steered angle δat is represented by the following equation 73.

$$That = -2Lt*Kf*\delta at/N \quad (73)$$
$$= -2Lt*Kf*\delta'/N$$
$$= -2Lt*Kf*(2WB/V)*\theta/N^2$$

The fluctuation component ΔThat of steering torque due to modification of steered angle of front wheels is a difference between steering torque That represented by the equation 73 and steering torque Th represented by the equation 70 and, accordingly, is represented by the following equation 74.

$$\Delta That = That - Th \quad (74)$$
$$= -2Lt*Kf*(2WB/V)*\theta/N^2 - (-2Lt*Kf*\theta/N^2)$$
$$= -2Lt*Kf*(2WB/V - 1)*\theta/N2$$

A corrected detected steering torque Thda which is calculated according to the following equation 75 by subtracting fluctuation component of steering torque ΔThat from steering torque Thd detected by a torque sensor is a steering torque which is removed of steering torque fluctuation due to modification of steered angle of front wheels.

$$Thda = Thd - \Delta That \quad (75)$$
$$= Thd + 2Lt*Kf*(2WB/V - 1)*\theta/N^2$$

Therefore, calculating a torque Tpad for alleviating steering load of a driver on the basis of corrected detected steering torque Thda enables to remove the influence of steering torque fluctuation due to modification of steered angle of front wheels. Setting a sum of torque Tpad for alleviating steering load of a driver and fluctuation component ΔThat of steering torque to a target steering assist torque Tpat enables to alleviate steering load of a driver while removing the influence of steering torque fluctuation due to modification of steered angle of front wheels. It is to be noted that torque Tpad for alleviating steering load may be calculated on the basis of corrected detected steering torque Thda and vehicle speed V so that it increases as the magnitude of corrected detected steering torque Thda increases and it decreases as vehicle speed V increases.

7-2-2) Exponential Target Trajectory

As described above, when target trajectory is exponential, steered angle of front wheel is controlled to a target steered angle represented by the equation 62 or 63 under a situation where steered angle is to be original steered angle δ. Accordingly, steering torque Thbt when steered angle is target steered angle δbt is represented by the following equation 76.

$$Thbt = -2Lt * Kf * \delta bt / N \qquad (76)$$
$$= -2Lt * Kf * (\delta' + \Delta\delta b) / N$$

The fluctuation component ΔThbt of steering torque due to modification of steered angle of front wheels is a difference between steering torque Thbt represented by the equation 76 and steering torque Th represented by the equation 70 and, accordingly, is represented by the following equation 77.

$$\Delta Thbt = Thbt - Th \qquad (77)$$
$$= -2Lt * Kf * (\delta' + \Delta\delta b) / N + 2Lt * Kf * \delta / N$$
$$= -2Lt * Kf * \{(2WB/V)\delta + \Delta\delta b\} /$$
$$N + 2Lt * Kf * \delta / N$$
$$= -2Lt * Kf * \{(2WB/V + 1)\delta + \Delta\delta b\} / N$$

A corrected detected steering torque Thdb which is calculated according to the following equation 78 by subtracting fluctuation component of steering torque ΔThbt from steering torque Thd detected by a torque sensor is a steering torque which is removed of steering torque fluctuation due to modification of steered angle of front wheels.

$$Thdb = Thd - \Delta Thbt \qquad (78)$$
$$= Thd + 2Lt * Kf * \{(2WB/V + 1)\delta + \Delta\delta b\} / N$$

Therefore, calculating a torque Tpad for alleviating steering load of a driver on the basis of corrected detected steering torque Thdb enables to remove the influence of steering torque fluctuation due to modification of steered angle of front wheels. Setting a sum of torque Tpad for alleviating steering load of a driver and fluctuation component ΔThbt of steering torque to a target steering assist torque Tpat enables to alleviate steering load of a driver while removing the influence of steering torque fluctuation due to modification of steered angle of front wheels. It is to be noted that torque Tpad for alleviating steering load may be calculated on the basis of corrected detected steering torque Thdb and vehicle speed V so that it increases as the magnitude of corrected detected steering torque Thdb increases and it decreases as vehicle speed V increases.

According to the first method, although steering torque Thd is not to be detected, steering torque fluctuation can not be reflected which is due to any cause other than steering operation such as friction coefficient fluctuation of road surface. To the contrary, according to the second method, although steering torque Thd is to be detected, steering torque fluctuation can be reflected which is due to any cause other than steering operation. Therefore, in first to fourth embodiments explained later in which steered angle control device is a mechanical steered angle control device, target assist torque Tpat is calculated according to the second method and assist torque is controlled so that it conforms to the target assist torque Tpat.

It is to be understood that when steered angle control device is mechanical steered angle control device, under a situation where trajectory control is not executed, torque Tpad for alleviating steering load is calculated on the basis of detected steering torque Thd without relation to whether steering reaction force control is conducted by the first or second method.

8) Steering Reaction Force Control in Non-Mechanical Steered Angle Control

As described above, modified detected steering angle Th0 represented by the above-mentioned equation 72 is a steering torque which does not include fluctuation component of steering torque due to modification of steered angle of front wheels when steered angle control device is mechanical steered angle control device and steering angle is δ. Accordingly, a value derived by subtracting torque Tpad for alleviating steering load from modified detected steering angle Th0 is a preferred steering torque for a driver when steered angle control device is mechanical steered angle control device. It is to be noted that torque Tpad for alleviating steering load may be calculated on the basis of modified detected steering angle Th0 and vehicle speed V so that it increases as the magnitude of modified detected steering angle Th0 increases and it decreases as vehicle speed V increases.

Therefore, when steered angle control device is a non-mechanical steered angle control device, preferred steering torque Thbt is a value calculated by the following equation 79. If the steering torque Thbt is imparted to a steering wheel, steering reaction force can be achieved which is not affected by steering torque fluctuation due to modification of steered angle of front wheels and can provide moderate steering load for a driver.

$$Thbt = Th0 - Tpad \qquad (79)$$

Thus, in fifth to eighth embodiments explained later in which steered angle control device is a non-mechanical steered angle control device, target steering torque Tpbt is calculated according to the equation 79 and steering torque is controlled so that it conforms to the target steering torque Tpbt.

It is to be understood that when steered angle control device is a non-mechanical steered angle control device, steering reaction force control under a situation where trajectory control is not executed is the same as that conducted under a situation where trajectory control is executed. In other word, without relation to whether or not trajectory control is executed, steering torque is controlled so that it conforms to the target steering torque Tpbt.

The present invention will now be described in detail with respect to first to eighth embodiments with reference to the accompanying drawings.

First Embodiment

As shown in the above-mentioned Table 1, the first embodiment has the following characteristics.

Steered angle control device: Semi-by-wire type
Target trajectory: Arc
Steered angle control: Feed-forward
Steering reaction force control: Assist torque control (second method)

FIG. 1 is a schematic configurational view showing a first embodiment of a vehicle travel control device according to the present invention which is applied to a vehicle equipped with a steered angle varying unit and an electric power steering unit.

In FIG. 1, reference numeral 10 denotes totally a vehicle travel control device according to the first embodiment of the present invention. The vehicle travel control device 10 is equipped on a vehicle 12 and includes a steered angle varying unit 14 and an electronic control unit 16. In FIG. 1, reference numerals 18FL and 18FR respectively denote left and right front wheels of the vehicle 12; and 18RL and 18RR respectively denote left and right rear wheels. The left and right front wheels 18FL and 18FR, which are the steerable wheels, are steered by a rack and pinion type electric power steering unit 22 via a rack bar 24, and tie rods 26L and 26R. The electric power steering unit 22 is driven in response to an operation of a steering wheel 20 by a driver.

The steering wheel 20 serves as a steering input means and is drivingly connected to a pinion shaft 34 of the electric power steering unit 22 via an upper steering shaft 28, a steered angle varying unit 14, a lower steering shaft 30, and a universal joint 32. In the exemplary embodiment shown in the figure, the steered angle varying unit 14 includes an electric motor 36 for supplementary steering driving. The electric motor 36 has a housing 14A linked to a lower end of the upper steering shaft 28 and a rotor 14B linked to an upper end of the lower steering shaft 30.

As is apparent from the above, the steered angle varying unit 14 rotates the lower steering shaft 30 relative to the upper steering shaft 28 so as to drive, for supplementary steering, the left and right front wheels 18FL and 18FR relative to the steering wheel 20. Accordingly, the steered angle varying unit 14 serves as a means for modifying steered angle of the left and right front wheels without depending on steering operation by a driver and is controlled by a steered angle control section of an electronic control unit 16.

In the illustrated embodiment, the electric power steering unit 22 is located concentric with the rack bar. The electric power steering unit 22 includes an electric motor 38 and a mechanism that converts the rotational torque of the electric motor 38 into a force in a reciprocating direction of the rack bar 24 such as, for example, a ball-screw type converting mechanism 40. The electric power steering unit 22 is controlled by an electric power steering system (EPS) control section of an electronic control unit 34. The electric power steering unit 22 serves as a steering assist force generating unit which reduces steering load on a driver by generating a steering assist force to drive the rack bar 24 relative to a housing 42. The steering assist force generating means may be of any configuration known in the art.

In the embodiment shown in the figure, the upper steering shaft 28 is provided with a steering angle sensor 50 which detects a rotational angle of the upper steering shaft 28 as a steering angle θ and a steering torque sensor 52 which detects a steering torque Thd. Signals indicative of a steering angle θ and a steering torque Thd are input to the electronic control unit 16. The electronic control unit 16 receives a signal indicative of a relative rotation angle θre of the steered angle varying unit 14 detected by a rotation angle sensor 54, which is a rotation angle of the lower steering shaft 30 relative to the upper steering shaft 28. The electronic control unit 16 further receives a signal indicative of a vehicle speed V detected by a vehicle speed sensor 56.

The individual sections of the electronic control unit 16 may be those which comprise microcomputers and each microcomputer may have a CPU, ROM, RAM, and an input/output port connected with one another via a bidirectional common bus. The steering angle sensor 50, the steering torque sensor 52 and the rotation angle sensor 54 detect a steering angle θ, a steering torque Thd and a relative rotation angle θre, respectively with the detected variables being positive when steering or wheel turning is conducted in left turning direction of a vehicle.

As will be described in detail hereinafter, the electronic control unit 16 controls the steered angle varying unit 14 and the electric power steering unit 22 in accordance with the flowcharts shown in FIGS. 2-5. In particular, the electronic control unit 16 decides the necessity of vehicle trajectory control on the basis of steering angle θ and vehicle speed V. When the electronic control unit 16 decides that no trajectory control is necessary, it calculates a target steering gear ratio Nt for achieving a predetermined steering characteristic on the basis of vehicle speed V so that the ratio becomes larger as vehicle speed V increases.

The electronic control unit 16 calculates a target pinion angle θpt which is a value of steering angle θ divided by a product of target steering gear ratio Nt and a gear ratio coefficient Ks (a positive constant). The electronic control unit 16 calculates a target relative rotation angle θret which is a difference between target pinion angle θpt and steering angle θ and controls the steered angle varying unit 14 so that the relative rotation angle θre of the steered angle varying unit 14 conforms to the target relative rotation angle θret.

When the electronic control unit 16 decides that trajectory control is necessary, it calculates a target steered angle δat=δ' of the front wheels for driving the vehicle along a target arc trajectory according to the above-mentioned equation 24 on the basis of steering angle θ and vehicle speed V at that time. The electronic control unit 16 controls the steered angle varying unit 14 in a feed-forward manner so that the steered angle of the front wheels conforms to the target steered angle δat, to thereby drive the vehicle along the target arc trajectory.

The electronic control unit 16 calculates a corrected detected steering torque Thda according to the above-mentioned equation 75 during executing the trajectory control and calculates a torque Tpad for alleviating steering load of a driver on the basis of the corrected detected steering torque Thda. The electronic control unit 16 calculates a change value ΔThat of steering torque according to the above-mentioned equation 74 and set a target assist torque Tpat to a sum of the torque Tpad for alleviating steering load of a driver and the change value ΔThat of steering torque. In addition, the electronic control unit 16 controls the electric power steering unit 22 so that the assist torque conforms to the target assist torque Tpat, to thereby alleviate steering load of a driver and reduces the change of steering torque due to the modification of steered angle.

It is to be noted that the above-described steering gear ratio control and assist torque control under a situation where no trajectory control is necessary do not constitute a major part of the present invention and these controls can be executed in any manner known in the art. The same goes in the other embodiments described later.

Figure 2:
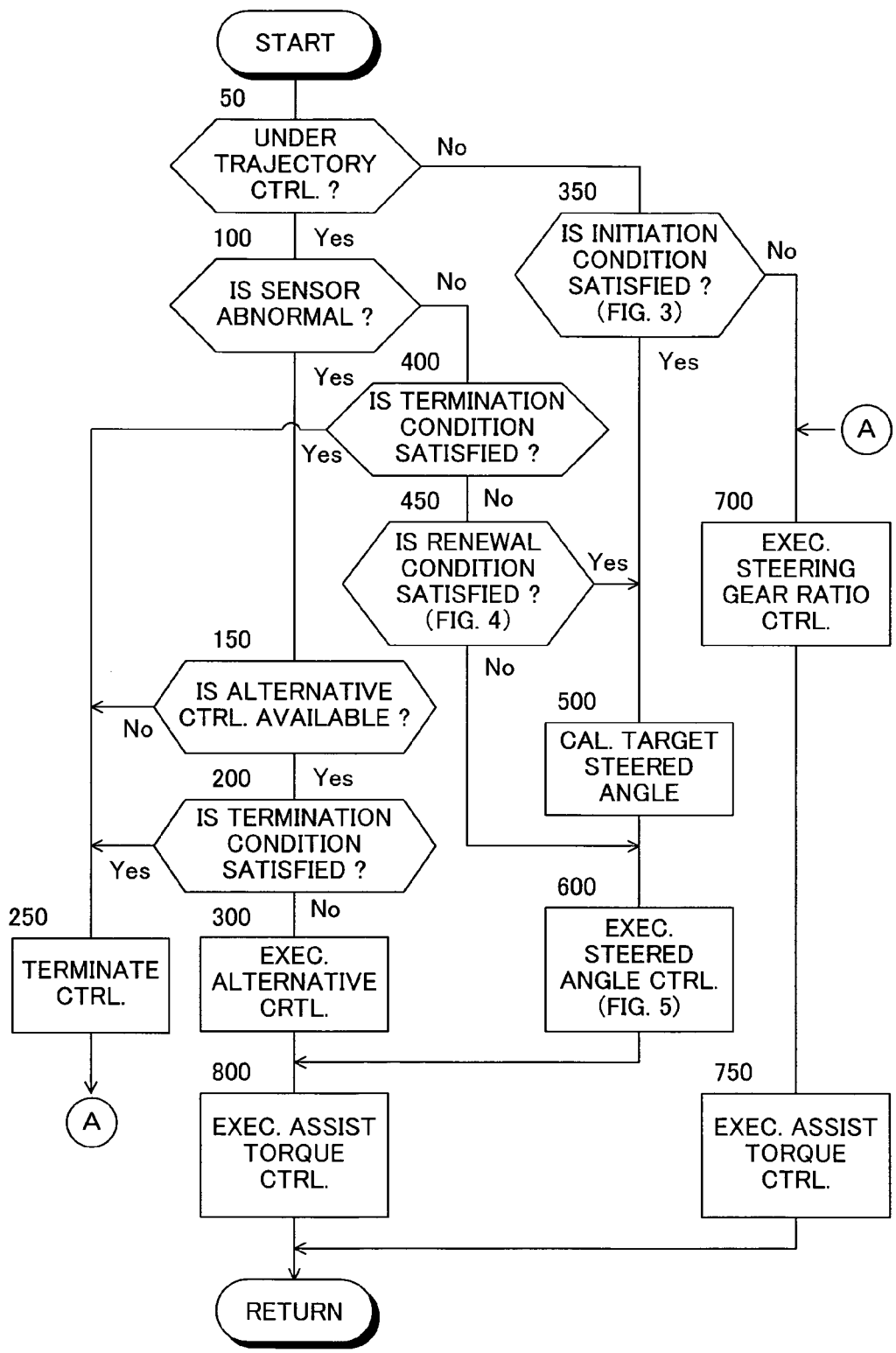
FIG. 2 is a flowchart showing the main routine of the travel control in the first embodiment.

Next, the vehicle travel control in the first embodiment will be described with reference to the flowcharts shown in FIGS. 2-5. The control according to the flowchart shown in FIG. 2 is started when an ignition switch not shown in the figure is turned on, and are repeatedly executed at predetermined intervals.

First, in step 50, a decision is made as to whether or not the vehicle trajectory control is executed by deciding whether or not a flag Fc is 1 which indicates whether or not the vehicle trajectory control is executed. When a decision is made that the trajectory control is not executed, the control proceeds to step 350, while when a decision is made that the trajectory control is executed, the control proceeds to step 100. It is to be noted that the flag Fc and a flag Fs described later are reset to 0 before initiating the travel control according to the flowchart shown in FIG. 2.

In step 100, a decision is made as to whether or not any one of the sensors is abnormal which are needed to the vehicle travel control, i.e. the steering angle sensor 50, the steering torque sensor 52, the rotation angle sensor 54 and the vehicle speed sensor 56. When a negative decision is made, the control proceeds to step 400, while when an affirmative decision is made, i.e. when a decision is made that any one of sensors is abnormal, the control proceeds to step 150.

In step 150, a decision is made as to whether or not an alternative steered angle control is possible in which an alternative detecting means detects the information that is to be detected by the abnormal sensor. When a negative decision is made, the control proceeds to step 250, while when an affirmative decision is made, the control proceeds to step 200.

For example, steering angle θ can be estimated on the basis of a rotation angle θm detected by a rotation angle sensor equipped in the electric motor 38 of the electric power steering unit 22 and the relative rotation angle θre of the steered angle varying unit 14 detected by the rotation angle sensor 54. Accordingly, a decision is made that an alternative steered angle control is possible under the situation where although the steering angle sensor 50 is abnormal, steering angle θ can be estimated on the basis of rotation angle Gm and relative rotation angle θre.

In step 200, a decision is made as to whether or not a termination condition of the trajectory control in the vehicle travel control is satisfied. When an affirmative decision is made, the control proceeds to step 250, while when a negative decision is made, the control proceeds to step 300. It is to be noted that when any of the following conditions 1) to 4) is satisfied, a decision may be made that a termination condition of the trajectory control is satisfied.

1) A time has passed since the time point when an initiation condition or a renewal condition of the trajectory control described later is satisfied, the time being more than Ta=1 (sec) which is required for the vehicle to get to a target arrival point.
2) The absolute value of a difference ΔV is larger than a reference value Ve (a positive constant), the difference being between a vehicle speed V at a time point where an initiation condition or a renewal condition is satisfied and a present vehicle speed V.
3) The absolute value of a difference Δθ is larger than a reference value θe (a positive constant), the difference being between a steering angle θ at a time point where an initiation condition or a renewal condition is satisfied and a present steering angle θ.
4) The absolute value of steering angle velocity, i.e. the absolute value of a changing rate θd of steering angle θ is larger than a reference value θde (a positive constant).

It should be understood that while the reference values θe and θde are constant, they may be variably set according to vehicle speed V so that they decreases as vehicle speed V at a time point where an initiation condition or a renewal condition is satisfied increases.

In step 250, the trajectory control is terminated by finishing the control where steered angle of the front wheels is made to conform to a target steered angle δat by means of the steered angle varying unit 14.

The flag Fc is reset to 0 which indicates whether or not the trajectory control is executed, and then the control proceeds to step 700.

In step 300, an alternative steered angle control, i.e. the control for modifying steered angle of the front wheels is executed by detecting the information that is to be detected by the abnormal sensor by means of alternative detecting means and subsequently the control proceeds to step 800.

Figure 3:
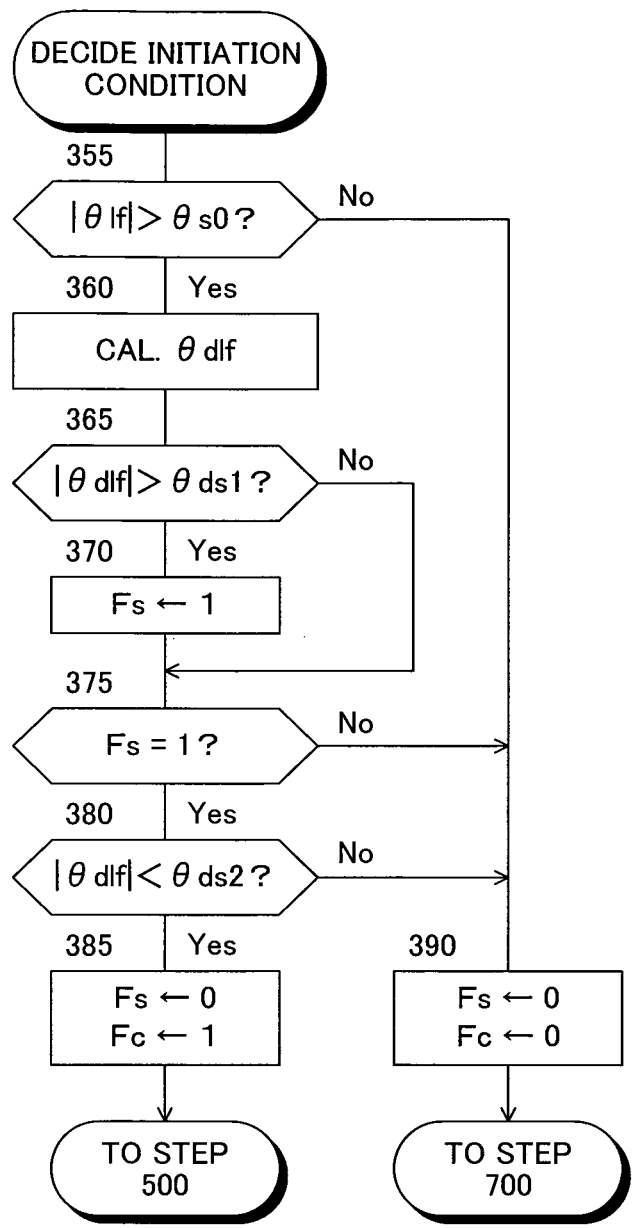
FIG. 3 is a flowchart showing the routine for deciding satisfaction of initiation condition of the trajectory control in the first embodiment.

In step 350, a decision is made as to whether or not an initiation condition of the trajectory control is satisfied according to the flowchart shown in FIG. 3. When an affirmative decision is made, the control proceeds to step 500, while when a negative decision is made, the control proceeds to step 700.

In step 400, a decision is made as to whether or not a termination condition of the trajectory control is satisfied in the same manner as in step 200. When an affirmative decision is made, the control proceeds to step 250, while when a negative decision is made, the control proceeds to step 450.

Figure 4:
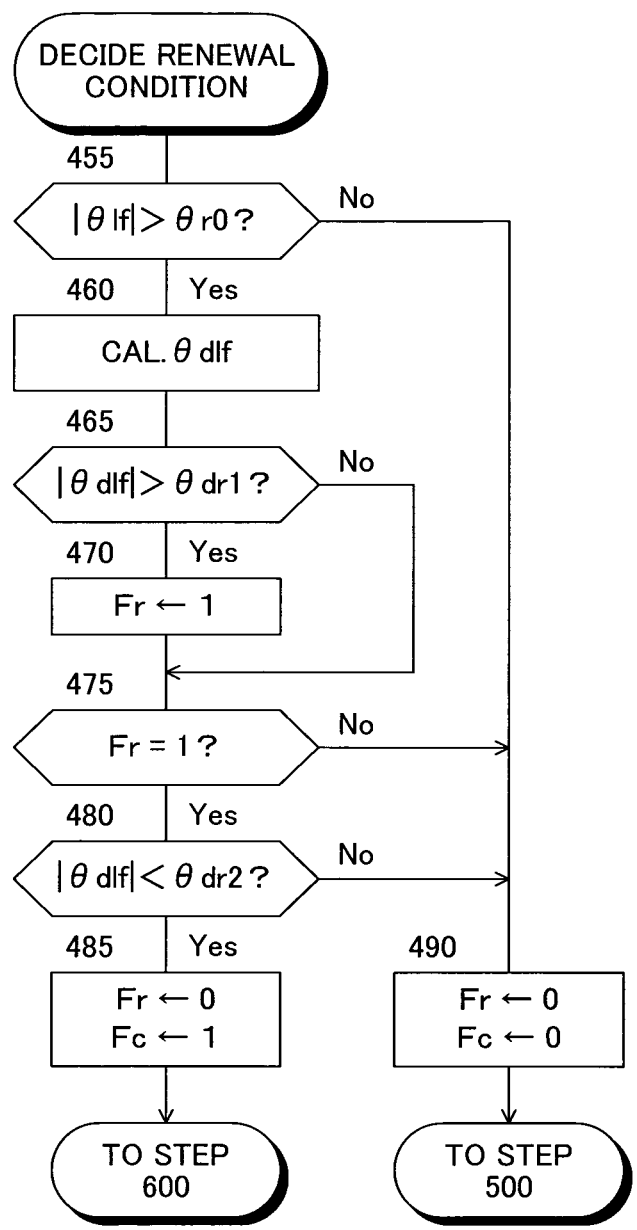
FIG. 4 is a flowchart showing the routine for deciding satisfaction of renewal condition of the trajectory control in the first embodiment.

In step 450, a decision is made as to whether or not a renewal condition of the trajectory control is satisfied according to the flowchart shown in FIG. 4. When an affirmative decision is made, the control proceeds to step 500, while when a negative decision is made, the control proceeds to step 600.

In step 500, a target steered angle δat (=δ') of the front wheels for driving the vehicle along a target arc trajectory is calculated according to the above-mentioned equation 24 on the basis of steering angle θ, vehicle speed V and steering gear ratio N (=Nt) at a time point when the trajectory control is initiated or renewed.

Figure 5:
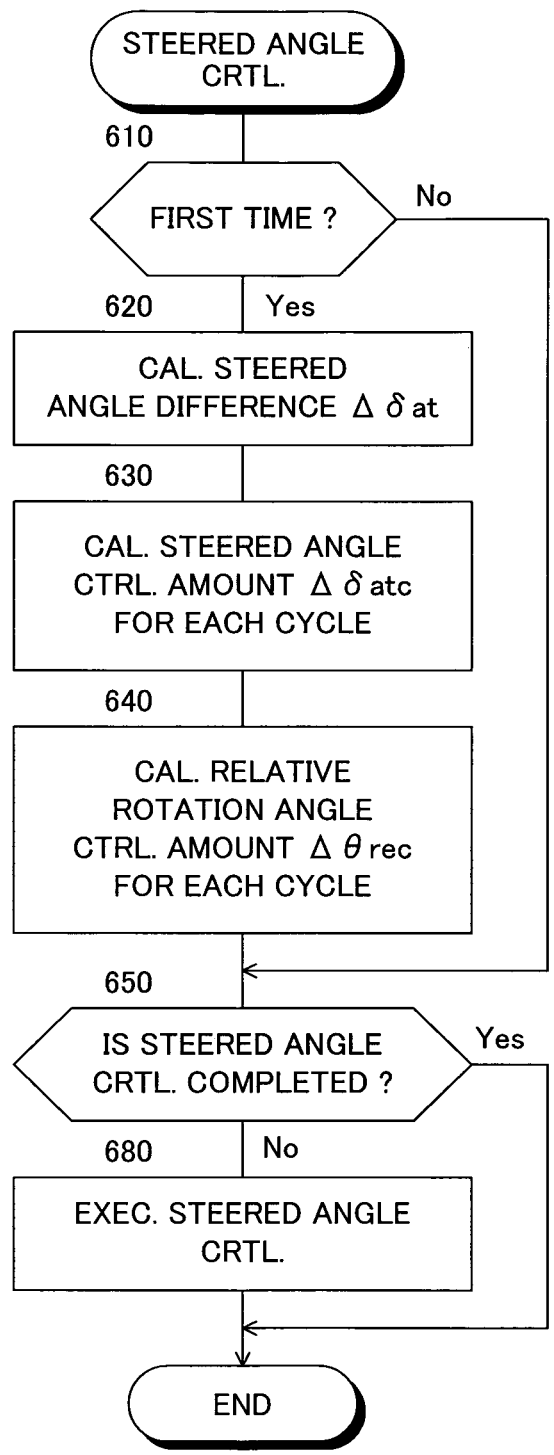
FIG. 5 is a flowchart showing the routine for controlling a steered angle of the front wheels in the first embodiment.

In step 600, the steered angle varying unit 14 is controlled in a feed-forward manner so that the steered angle of the front wheels conforms to the target steered angle δat according to the flowchart shown in FIG. 5. Accordingly, the steered angle of the front wheels is controlled to be the target steered angle δat in a feed-forward manner.

It is to be noted that the steered angle of the front wheels is changed at a changing rate which is not higher than a predetermined limit value so that the steered angle of the front wheels is not changed too rapidly. The same goes in the other embodiments described later. When the steered angle of the front wheels has been controlled to the target steered angle δat, relative rotation angle control for the trajectory control is not executed until the trajectory control is terminated or renewed.

Figure 6:
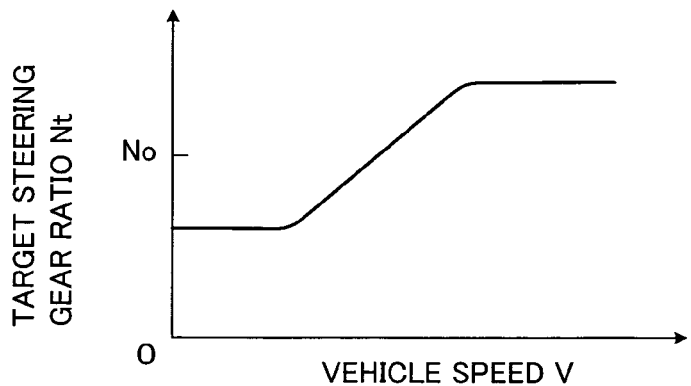
FIG. 6 is a graph showing the relation between vehicle speed V and target steering gear ratio Nt.

In step 700, a steering gear ratio control during no trajectory control is executed is conducted. That is, a target steering gear ratio Nt is calculated from a map corresponding to the graph shown in FIG. 6 on the basis of vehicle speed V. In FIG. 6, NO indicates a normal steering gear ratio, i.e. a steering gear ratio under the situation where rotation angle of the lower steering shaft 30 relative to the upper steering shaft 28 is 0.

A target pinion angle θpt is calculated by dividing a product of steering angle θ and the gear ratio coefficient Ks by the target steering gear ratio Nt, the coefficient being a positive constant corresponding to a ratio of the rotation angle of the pinion 34 relative to changing amount of steered angle of the left and right front wheels. A target relative rotation angle θret is calculated which is a difference between target pinion angle θpt and steering angle θ and the steered angle varying unit 14 is controlled so that the relative rotation angle θre of the steered angle varying unit 14 conforms to the target relative rotation angle θret.

When the control is transferred to steering gear ratio control in step 700 after termination of the trajectory control, the steered angle varying unit 14 is controlled so that the steering gear ratio is not so rapidly changed to the target steering gear ratio Nt so as to prevent rapid change of steered angle of the front wheels. The same goes in the other embodiments described later.

In step 750, an assist torque control during no trajectory control is executed is conducted. That is, a basic assist torque Tpab is calculated from a map corresponding to the graph shown in FIG. 7 on the basis of detected steering torque Thd and a vehicle speed coefficient Kv is calculated from a map corresponding to the graph shown in FIG. 8 on the basis of vehicle speed V. A target assist torque Tpat is calculated which is a product of the vehicle speed coefficient Kv and the basic assist torque Tpab and the electric power steering unit 22 is controlled so that the assist torque conforms to the target assist torque Tpat.

Figure 9:
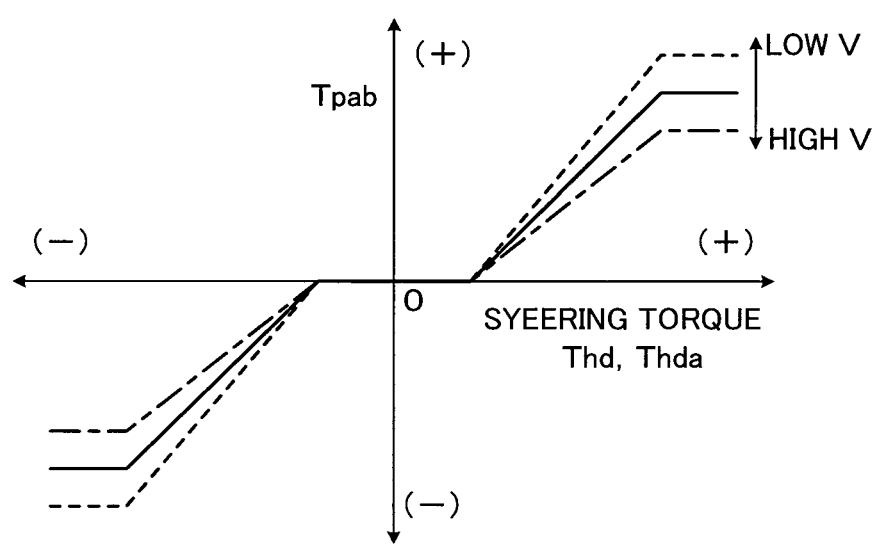
FIG. 9 is a graph showing the relation among steering torque Thd or Thda, vehicle speed V and basic assist torque Tpab.

It is to be noted that a basic assist torque Tpab may be calculated from a map corresponding to the graph shown in FIG. 9 on the basis of steering torque Thd and vehicle speed V.

Figure 7:
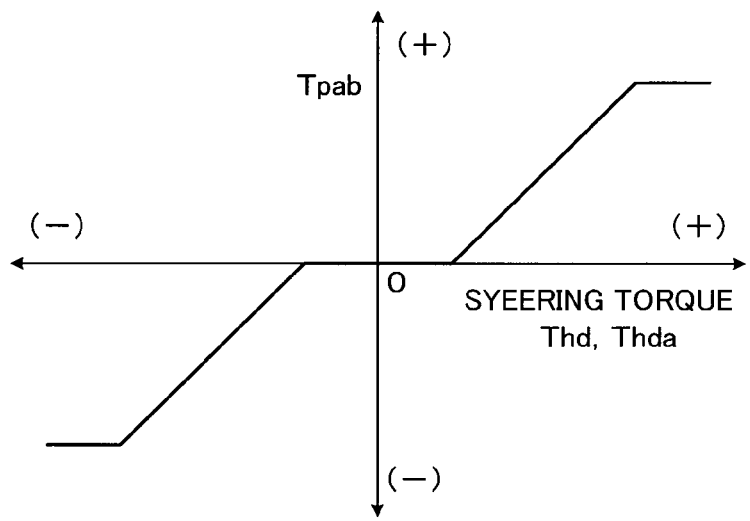
FIG. 7 is a graph showing the relation between steering torque Thd or Thda and basic assist torque Tpab.
Figure 8:
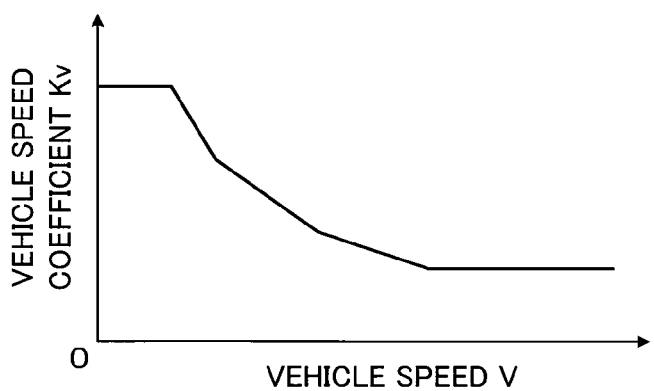
FIG. 8 is a graph showing the relation between vehicle speed V and vehicle speed coefficient Kv.

In step 800, a corrected detected steering torque Thda is calculated according to the above-mentioned equation 75 and a basic assist torque Tpab is calculated from a map corresponding to the graph shown in FIG. 7 on the basis of the corrected detected steering torque Thda. A vehicle speed coefficient Kv is calculated from a map corresponding to the graph shown in FIG. 8 on the basis of vehicle speed V and a steering load alleviating torque Tpad is calculated to a product of the vehicle speed coefficient Kv and the basic assist torque Tpab. A target assist torque Tpat is calculated to a sum of the steering load alleviating torque Tpad and a change value $\Delta$That of steering torque. The electric power steering unit 22 is controlled so that the assist torque conforms to the target assist torque Tpat.

Next, the routine for deciding satisfaction of initiation condition of the trajectory control will be described with reference to the flowchart shown in FIG. 3.

First, in step 355, a low-pass-filtered steering angle $\theta$lf is calculated by subjecting steering angle $\theta$ to low-pass filter processing. Then, a decision is made as to whether or not an absolute value of a low-pass-filtered steering angle $\theta$lf is larger than a reference value $\theta$s0 (a positive constant) for deciding initiation of the trajectory control. When a negative decision is made, the control proceeds to step 390 while when an affirmative decision is made, the control proceeds to step 360.

In step 360, a steering angle velocity $\theta$d is calculated which is a differential value of steering angle $\theta$ and a low-pass-filtered steering angle velocity $\theta$dlf is calculated by subjecting steering angle velocity $\theta$d to low-pass filter processing.

In step 365, a decision is made as to whether or not an absolute value of a low-pass-filtered steering angle velocity $\theta$dlf is larger than a first reference value $\theta$ds1 (a positive constant) for deciding initiation of the trajectory control. When a negative decision is made, the control proceeds to step 375 while when an affirmative decision is made, in step 370 flag Fs is set to 1 so as to indicate that decision of initiation of the trajectory control has been conducted and then the control proceeds to step 375.

In step 375, a decision is made as to whether or not a flag Fs is 1, that is, whether or not decision of initiation of the trajectory control has been conducted. When a negative decision is made, the control proceeds to step 390 while when an affirmative decision is made, the control proceeds to step 380.

In step 380, a decision is made as to whether or not an absolute value of a low-pass-filtered steering angle velocity $\theta$dlf is smaller than a second reference value $\theta$ds2 (a positive constant which is not larger than $\theta$ds1) for deciding initiation of the trajectory control. When a negative decision is made, the control proceeds to step 390 while when an affirmative decision is made, the control proceeds to step 385.

In step 385, flag Fs is set to 0 so as to indicate that decision of initiation of the trajectory control has not been conducted and flag Fc is set to 1 so as to indicate that the trajectory control is being executed. Then the control proceeds to step 500.

In step 390, flag Fs is set to 0 so as to indicate that decision of initiation of the trajectory control has not been conducted and flag Fc is set to 0 so as to indicate that the trajectory control is not being executed. Then the control proceeds to step 700.

It should be understood that while the reference values $\theta$s0, $\theta$ds1 and $\theta$ds2 are constant, they may be variably set according to vehicle speed V so that they decreases as vehicle speed V increases.

Steps 455-490 of routine for deciding satisfaction of renewal condition of the trajectory control shown in FIG. 4 are conducted in the same manner as in steps 355-390, respectively, of routine for deciding satisfaction of initiation condition of the trajectory control.

It should be understood that the reference value for the decision in step 455 is a reference value $\theta$r0 (a positive constant) for deciding renewal of the trajectory control. The reference value for the decision in step 465 is a first reference value $\theta$dr1 (a positive constant) for deciding renewal of the trajectory control and the reference value for the decision in step 480 is a second reference value $\theta$dr2 (a positive constant which is not larger than $\theta$dr1) for deciding renewal of the trajectory control. While the reference values $\theta$r0, $\theta$dr1 and $\theta$dr2 are constant, they may be variably set according to vehicle speed V so that they decrease as vehicle speed V increases.

In steps 470, 475, 485 and 490, flag Fs is changed to flag Fr for indicating whether or not decision of renewal of the control has not been conducted. After completion of step 485, the control proceeds to step 600 and after completion of step 490, the control proceeds to step 500.

Next, the routine for steered angle control which is conducted in the above-mentioned step 600 will be described with reference to the flowchart shown in FIG. 5.

First, in step 610, a decision is made as to whether or not the steered angle control is conducted for the first time for the trajectory control, that is, whether or not the steered angle control is conducted just after initiation or renewal of the trajectory control. When a negative decision is made, the control proceeds to step 650 while when an affirmative decision is made, the control proceeds to step 620.

In step 620, steered angle $\delta$ of the front wheels is calculated on the basis of steering angle $\theta$ and relative rotation angle $\theta$re at a time point of initiation or renewal of the trajectory control and a steered angle difference $\Delta\delta$at of the front wheels is calculated which is a difference between target steered angle $\delta$at and steered angle $\delta$ of the front wheels.

In step 630, a steered angle control amount $\Delta\delta$atc for each cycle is calculated which is required to change steered angle of the front wheels to target steered angle $\delta$at at a change rate that is not larger than a predetermined limit value with the assumption that no steering operation is conducted by a driver. For example, supposing that steered angle of the front wheels is changed to target steered angle $\delta$at over Nc cycles, a steered angle control amount $\Delta\delta$atc is $\Delta\delta$at/Nc.

In step 640, a relative rotation control amount $\Delta\theta$rec for each cycle for rotating the lower steering shaft 30 relative to the upper steering shaft 28 is calculated to a product of relative rotation control amount $\Delta\theta$re and steered angle control amount $\Delta\delta$atc and steering gear ratio coefficient Ks.

In step 650, a decision is made as to whether or not steered angle control of the front wheels for the trajectory control has been completed by deciding whether or not Nall is Nc with the cycle numbers which have passed since the trajectory control was initiated or renewed being referred to Nall.

When an affirmative decision is made, the steered angle control is once ended and the control proceeds to step 800 with no rotation drive of the lower steering shaft 30 relative to the upper steering shaft 28. To the contrary, a negative decision is made, in step 680, the lower steering shaft 30 is rotated relative to the upper steering shaft 28 by relative rotation control amount $\Delta\theta$rec and then the control proceeds to step 800.

In the first embodiment, under the situation where the trajectory control is not executed, when initiation condition of the trajectory control is satisfied, a negative decision is made in step 50 and an affirmative decision is made in step 350. In step 500, a target steered angle $\delta$at of the front wheels is calculated which is for driving the vehicle along the target arc trajectory and in step 600, steered angle of the front wheels is controlled to the target steered angle $\delta$at in a feed-forward manner.

When renewal condition of the trajectory control is satisfied under the situation where the trajectory control is executed, affirmative decisions are made in steps 50 and 450. Then steps 500 and 600 are conducted.

Therefore, according to the first embodiment, under the situation where the trajectory control is to be executed, it is possible to control steered angle of the front wheels to target steered angle $\delta$at, which enables to control traveling trajectory of the vehicle so that the vehicle travels along the target arc trajectory without requiring steering operation by a driver.

According to the first embodiment, in particular, the steered angle control of the front wheels is the feed-forward control executed on the basis of steering angle $\theta$ and relative rotation angle $\theta$re at a time point of initiation or renewal of the trajectory control. When the steered angle of the front wheels has been controlled to the target steered angle $\delta$at, relative rotation angle control by the steered angle varying unit 14 is not executed until the trajectory control is terminated or renewed. Accordingly, trajectory control in which the target trajectory is arc can be simply executed as compare with the case where, as in a second embodiment described later, the steered angle control of the front wheels is a feed-back control.

Second Embodiment

As shown in the above-mentioned Table 1, the second embodiment has the following characteristics.
Steered angle control device: Semi-by-wire type
Target trajectory: Arc
Steered angle control: Feed-back
Steering reaction force control: Assist torque control (second method)

While the vehicle travel control in the second embodiment is executed substantially in the same manner as in the above-mentioned first embodiment, in the steered angle control in step 600, the steered angle of the front wheels is controlled in a feed-back manner.

That is, present steered angle $\delta$ of the front wheels is acquired in each cycle on the basis of steering angle $\theta$ and relative rotation angle $\theta$re and a target relative rotation angle $\theta$ret is calculated which is a difference between target steered angle $\delta$at of the front wheels and present steered angle $\delta$. The steered angle varying unit 14 is controlled so that it rotates the lower steering shaft 30 relative to the upper steering shaft 28 by target relative rotation angle $\theta$ret, whereby the steered angle of the front wheels is controlled to the target steered angle $\delta$at. Accordingly, steered angle of the front wheels can be controlled to target steered angle $\delta$at in a feed-back manner and the vehicle travels along the target arc trajectory.

Therefore, according to the second embodiment, under the situation where the trajectory control is to be executed, it is possible to control steered angle of the front wheels to target steered angle $\delta$at, which enables to control traveling trajectory of the vehicle so that the vehicle travels along the target arc trajectory with or without steering operation by a driver.

According to the second embodiment, in particular, a target relative rotation angle $\theta$ret is calculated which is a difference between target steered angle oat of the front wheels and present steered angle $\delta$ of the front wheel. Accordingly, even if steering operation is conducted by a driver after the trajectory control was initiated or renewed, steered angle of the front wheels can surely be controlled to target steered angle $\delta$at. In such a case where steering operation is conducted by a driver so that steered angle becomes the value which is proper to drivel the vehicle along the target arc trajectory, feed-back control amount decreases. Therefore, if driver is a skillful driver, the control amount of the steered angle varying unit 14 can be reduced as compared with the above-mentioned first embodiment, which alleviates the load of the unit.

Third Embodiment

As shown in the above-mentioned Table 1, the third embodiment has the following characteristics.
Steered angle control device: Semi-by-wire type
Target trajectory: Exponential
Steered angle control: Feed-forward
Steering reaction force control: Assist torque control (second method)

Figure 10:
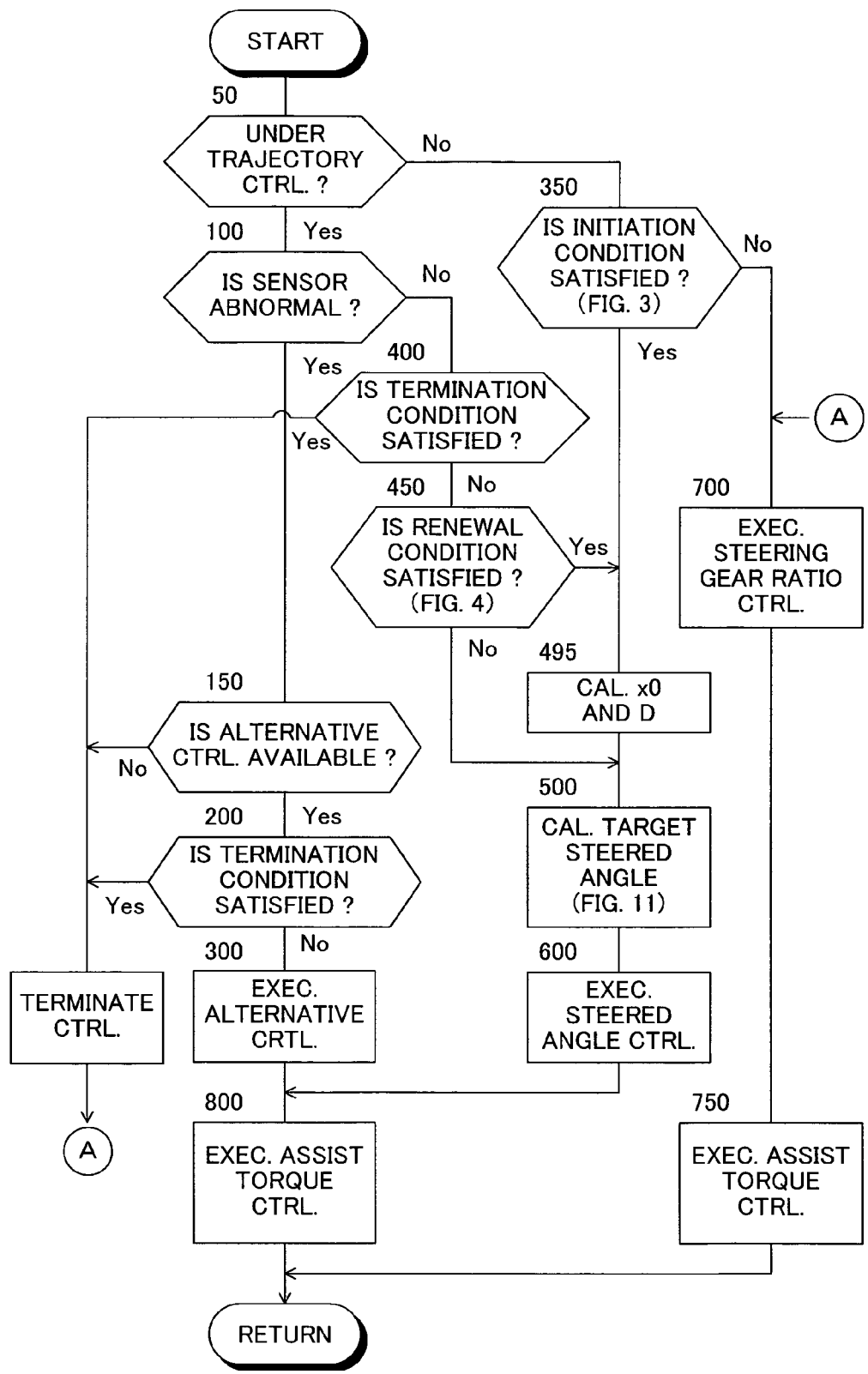
FIG. 10 is a flowchart showing the main routine of the travel control in a third embodiment.

As shown in FIG. 10, the vehicle travel control in the third embodiment is executed substantially in the same manner as in the above-mentioned first embodiment. Notably, in FIG. 10, steps corresponding to those shown in FIG. 2 are denoted by the same step numerals as used in FIG. 2.

However, when affirmative decisions are made in steps 350 and 450, in step 495, steered angle $\delta$ of the front wheels is calculated on the basis of steering angle $\theta$ and relative rotation angle $\theta$re, and distance xo is calculated according to the above-mentioned equation 46 on the basis of steered angle $\delta$ of the front wheels and vehicle speed V. Again in step 495, correction coefficient D is calculated according to the above-mentioned equation 42 in which minimum time $\Delta$T and k of Weber ratio are positive constants previously set for a general driver.

Figure 11:
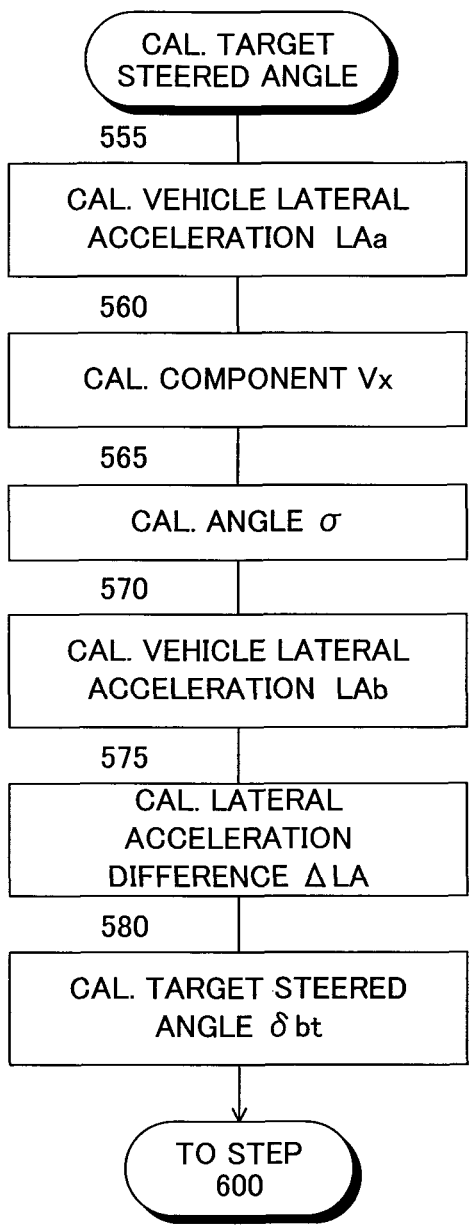
FIG. 11 is a flowchart showing the routine for calculating target steered angle of the front wheels of the travel control in the third embodiment.

In the third embodiment, in step 550, a target steered angle $\delta$bt of the front wheels is calculated which is for driving the vehicle along the target exponential trajectory Te according to the flowchart shown in FIG. 11.

Step 550 is conducted by steps 555-580 in the flowchart shown in FIG. 11. First, in step 555, vehicle lateral acceleration LAa is calculated according to the above-mentioned equation 47 on the basis of steering angle $\theta$ and vehicle speed V.

In step 560, a component Vx parallel to coordinate related to distance x is calculated as one component of vehicle speed V according to the above-mentioned equation 49 on the basis of steered angle $\delta$ of the front wheels and vehicle speed V at a time point when the trajectory control is initiated or renewed.

In step 565, a component Vy parallel to time-related coordinate is calculated as the other component of vehicle speed V according to the above-mentioned equation 50 and an angle $\sigma$ which the component Vx forms with vehicle speed V is calculated according to the above-mentioned equation 52.

In step 570, vehicle lateral components Vxx and Vyx are calculated according to the above-mentioned equations 53 and 54, respectively and a vehicle lateral acceleration LAb is calculated according to the above-mentioned equations 55 and 56.

In step 575, a difference ΔLA is calculated according to the above-mentioned equation 57, the difference being a difference between vehicle lateral acceleration LAb for driving the vehicle along the exponential trajectory Te and vehicle lateral acceleration LAa for driving the vehicle along the arc trajectory Tc.

In step 580, a target steered angle δbt of the front wheels for driving the vehicle along exponential trajectory Te is calculated according to the above-mentioned equation 62 during left turning and is calculated according to the above-mentioned equation 63 during right turning on the basis of steering angle θ, vehicle speed V and lateral acceleration difference ΔLA at a time point when the trajectory control is initiated or renewed.

In step 600 in the third embodiment, a target relative rotation angle θret is calculated which is a difference between target steered angle δbt and steered angle δf of the front wheels in previous cycle. The steered angle varying unit 14 is controlled so that it rotates the lower steering shaft 30 relative to the upper steering shaft 28 by target relative rotation angle θret, whereby the steered angle of the front wheels is controlled to the target steered angle δbt. Accordingly, steered angle of the front wheels can be controlled to target steered angle δbt in a feed-forward manner and the vehicle travels along the target exponential trajectory.

Therefore, according to the third embodiment, under the situation where the trajectory control is to be executed, it is possible to control steered angle of the front wheels to target steered angle δbt, which enables to control traveling trajectory of the vehicle so that the vehicle travels along the target exponential trajectory without requiring steering operation by a driver.

According to the third embodiment, in particular, as in the first embodiment, the steered angle control of the front wheels is the feed-forward control executed on the basis of steering angle θ and relative rotation angle θre at a time point of initiation or renewal of the trajectory control. Accordingly, trajectory control in which the target trajectory is exponential can be simply executed as compare with the case where, as in a fourth embodiment described later, the steered angle control of the front wheels is the feed-back control.

Fourth Embodiment

As shown in the above-mentioned Table 1, the fourth embodiment has the following characteristics.
Steered angle control device: Semi-by-wire type
Target trajectory: Exponential
Steered angle control: Feed-back
Steering reaction force control: Assist torque control (second method)

While the vehicle travel control in the fourth embodiment is executed substantially in the same manner as in the above-mentioned third embodiment, in the steered angle control in step 600, the steered angle of the front wheels is controlled in a feed-back manner.

That is, present steered angle δ of the front wheels is acquired in each cycle on the basis of steering angle θ and relative rotation angle θre, and a target relative rotation angle θret is calculated which is a difference between target steered angle δbt of the front wheels and steered angle δ. The steered angle varying unit 14 is controlled so that it rotates the lower steering shaft 30 relative to the upper steering shaft 28 by target relative rotation angle θret, whereby the steered angle of the front wheels is controlled to the target steered angle δbt. Accordingly, steered angle of the front wheels can be controlled to target steered angle δbt in a feed-back manner and the vehicle travels along the target exponential trajectory.

Therefore, according to the fourth embodiment, under the situation where the trajectory control is to be executed, it is possible to control steered angle of the front wheels to target steered angle δbt, which enables to control traveling trajectory of the vehicle so that the vehicle travels along the target exponential trajectory with or without steering operation by a driver.

According to the fourth embodiment, in particular, a target relative rotation angle θret is calculated which is a difference between target steered angle δbt of the front wheels and present steered angle δ of the front wheel. Accordingly, even if steering operation is conducted by a driver after the trajectory control was initiated or renewed, steered angle of the front wheels can surely be controlled to target steered angle δbt. In such a case where steering operation is conducted by a driver so that steered angle becomes the value which is proper to drive the vehicle along the target exponential trajectory, feed-back control amount decreases. Therefore, if driver is a skillful driver, the control amount of the steered angle varying unit 14 can be reduced as compared with the above-mentioned third embodiment, which alleviates the load of the unit.

In the above-mentioned first to fourth embodiments, even if abnormality arises in any sensor such as steering angle sensor 50 which is necessary to execute the trajectory control, alternative steered angle control is executed under the situation where alternative steered angle control is possible which utilizes an alternative detecting means. That is, even if an affirmative decision is made in step 100, an affirmative decision is made in step 150 under the situation where alternative steered angle control is possible and alternative steered angle control is executed in step 300.

Therefore, even if abnormality arises in any sensor such as steering angle sensor 50, the trajectory control by alternative steered angle control can be executed by effectively utilizing an alternative detecting means, which enables to drive the vehicle along target trajectory by the trajectory control conducted by alternative steered angle control.

In the above-mentioned first to fourth embodiments, in step 750, a change value ΔThat of steering torque for canceling the change of steering torque is calculated. Then, in step 800, a target assist torque Tpat is calculated to a sum of the steering load alleviating torque Tpad and a change value ΔThat of steering torque and the electric power steering unit 22 is controlled so that the assist torque conforms to the target assist torque Tpat.

Therefore, steering load of a driver can not only be alleviated, but also the change of steering torque due to steered angle control in the trajectory control can be canceled, which enables to effectively prevent the driver from feeling odd for the reason of steering torque change due to the trajectory control.

Fifth Embodiment

As shown in the above-mentioned Table 2, the fifth embodiment has the following characteristics.
Steered angle control device: By-wire type
Target trajectory: Arc
Steered angle control: Feed-forward Steering reaction force control: Steering reaction force control of non mechanical steered angle control device FIG. 12 is a schematic configurational view showing a fifth embodiment of a vehicle travel control device according to the present invention which is applied to a vehicle equipped with a by-wire type steering unit.

Figure 12:
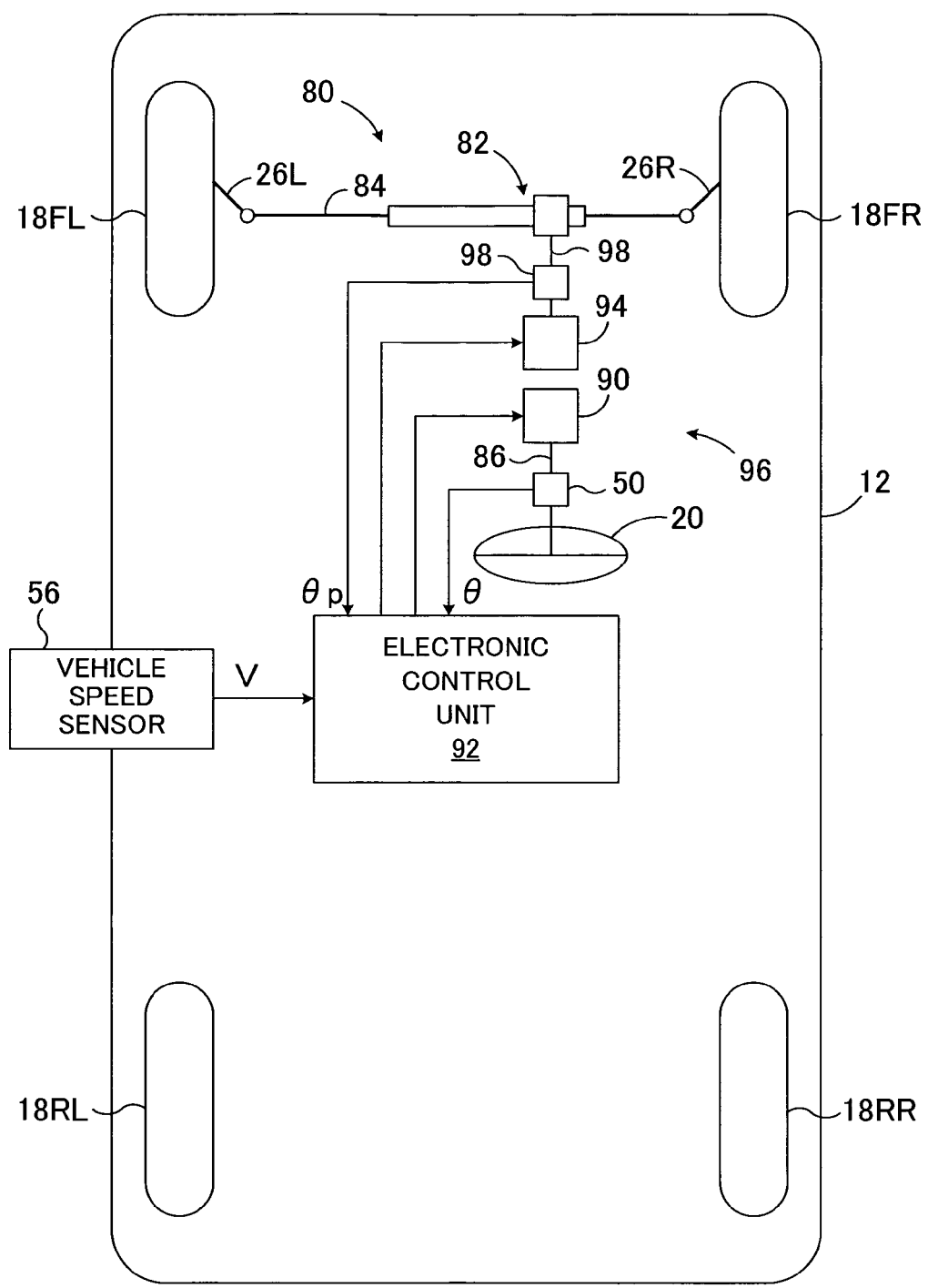
FIG. 12 is a schematic configurational view showing a fifth embodiment of a vehicle travel control device according to the present invention which is applied to a vehicle equipped with a steering init of by-wire type.

In FIG. 12, reference numeral 80 denotes totally a vehicle travel control device according to the fifth embodiment. When a steering wheel 20 serving as an steering input means is operated by a driver, a rack bar 84 and tie rods 26L and 26R are actuated by means of a rack and pinion type steering mechanism 82, whereby the left and right front wheels 18FL and 18FR are steered.

A steering shaft 86 coupled to steering wheel 20 and a pinion shaft 88 of the steering mechanism 82 are not connected with each other. A steering reaction force applying electric motor 90 is connected to the steering shaft 86 via a speed reduction gear mechanism not shown in FIG. 12. The electric motor 90 is controlled by a steering reaction force control section of an electronic control unit 92 to impart predetermined steering reaction torque to the steering wheel 20. A steering electric motor 94 is connected to the pinion shaft 88 via a speed reduction gear mechanism not shown in FIG. 12. The electric motor 94 is controlled by a steered angle control section of an electronic control unit 92 to rotate the pinion shaft 88.

While in the illustrated embodiment, the rotation of the pinion shaft 88 is converted to linear motion of the rack bar 84 by the rack and pinion type steering mechanism 82 which serves as rotation-linear motion transfer mechanism, steering mechanism may be of any configuration known in the art.

As is apparent from the above, the steering wheel 20, the steering mechanism 82, the electric motors 90 and 94, and the like constitute a by-wire type steering unit 96 which steers left and right front wheels 18FL and 18FR according to steering operation by a driver and modifies steered angle of the left and right front wheels without depending on steering operation by a driver.

The steering shaft 86 is provided with a steering angle sensor 50 which detects a rotational angle θ and a signal indicative of a steering angle θ is input to the electronic control unit 92. The electronic control unit 92 receives a signal indicative of a vehicle speed V detected by a vehicle speed sensor 56 and a signal indicative of a rotation angle θp of the pinion shaft 88 detected by a rotation angle sensor 98.

The individual control sections of the electronic control unit 92 may be those which comprise microcomputers and each microcomputer may have a CPU, ROM, RAM, and an input/output port connected with one another via a bidirectional common bus. The steering angle sensor 50 and the rotation angle sensor 98 detect a steering angle θ and a rotation angle θp, respectively with the detected variables being positive when steering or wheel turning is conducted in left turning direction of a vehicle.

As will be described in detail hereinafter, the electronic control unit 92 controls the electric motors 90 and 94 of the steering unit 96 in accordance with the flowcharts shown in FIGS. 13 and 14. In particular, the electronic control unit 92 decides the necessity of vehicle trajectory control on the basis of steering angle θ and vehicle speed V. When the electronic control unit 92 decides that no trajectory control is necessary, it calculates a target steering gear ratio Nt for achieving a predetermined steering characteristic on the basis of vehicle speed V so that the ratio becomes larger as vehicle speed V increases.

When the electronic control unit 92 decides that trajectory control is necessary, it calculates a target steered angle δat=δ' of the front wheels for driving the vehicle along a target arc trajectory according to the above-mentioned equation 24 on the basis of steering angle θ and vehicle speed V at that time. The electronic control unit 92 controls the electric motors 94 of the steering unit 96 so that the steered angle of the front wheels conforms to the target steered angle δat with or without steering operation by a driver.

It is to be noted that when the steered angle of the front wheels conforms to the target steered angle δat, the electronic control unit 92 does not change the steered angle of the front wheels as long as renewal condition or termination condition of the trajectory control is not satisfied.

Irrespective of whether or not the trajectory control is executed, the electronic control unit 92 calculates modified detected steering torque Th0 according to the above-mentioned equation 72 and calculates a torque Tpad for alleviating steering load of a driver on the basis of the modified detected steering torque Th0 and vehicle speed V.

Next, the vehicle travel control in the fifth embodiment will be described with reference to the flowcharts shown in FIGS. 13 and 14. The control according to the flowchart shown in FIG. 13 is started when an ignition switch not shown in the figure is turned on, and are repeatedly executed at predetermined intervals. Notably, in FIGS. 13 and 14, steps corresponding to those shown in FIGS. 2 and 5 are denoted by the same step numerals as used in FIGS. 2 and 5, respectively.

Figure 13:
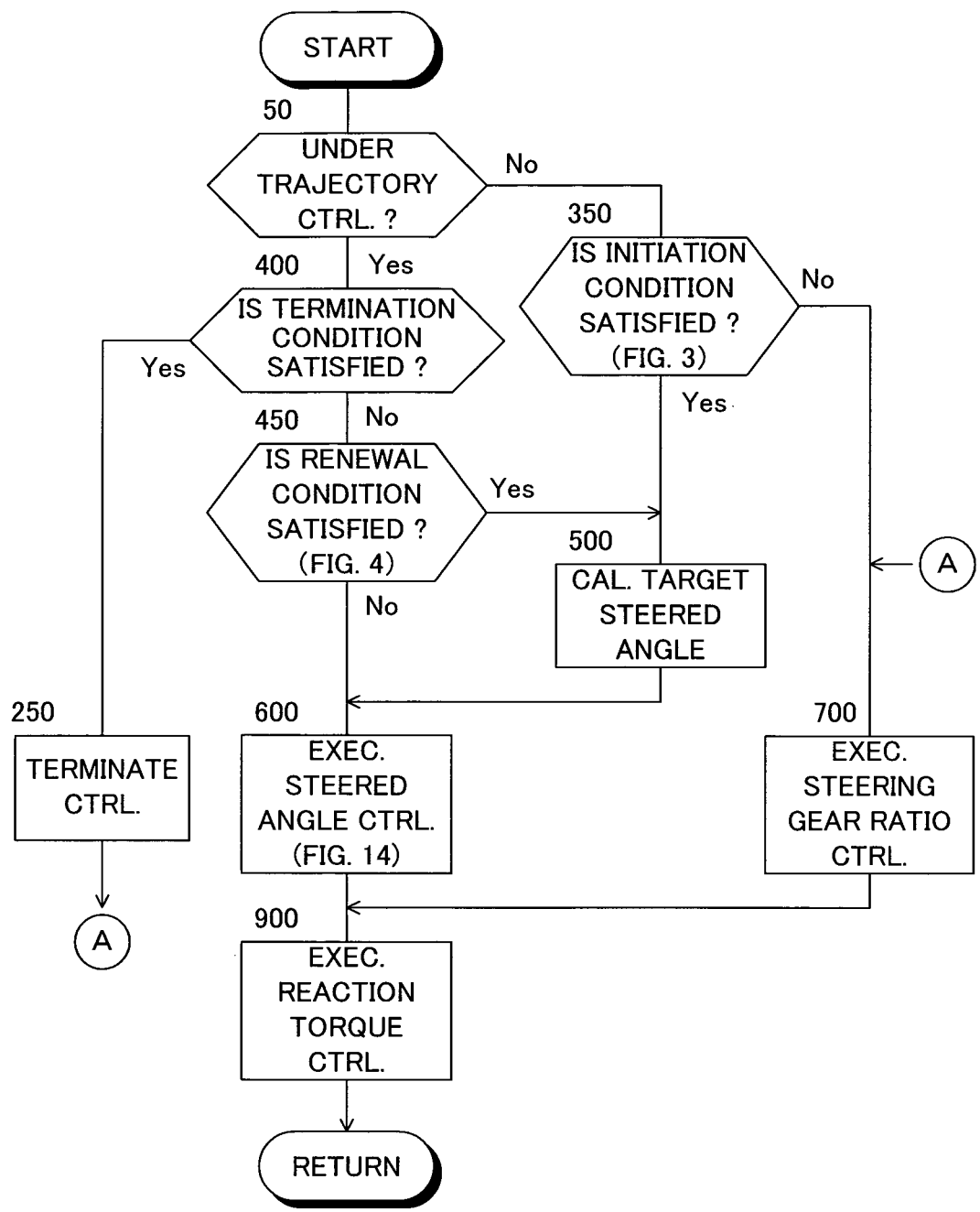
FIG. 13 is a flowchart showing the main routine of the travel control in the fifth embodiment.

As will be understood from the comparison of FIGS. 13 and 2, in the fifth embodiment, steps corresponding to steps 100-300 and step 750 in the first embodiment are not conducted. When an affirmative decision is made in step 50, the control proceeds to step 400 and when step 600 or 700 is completed, the control proceeds to step 900.

Figure 14:
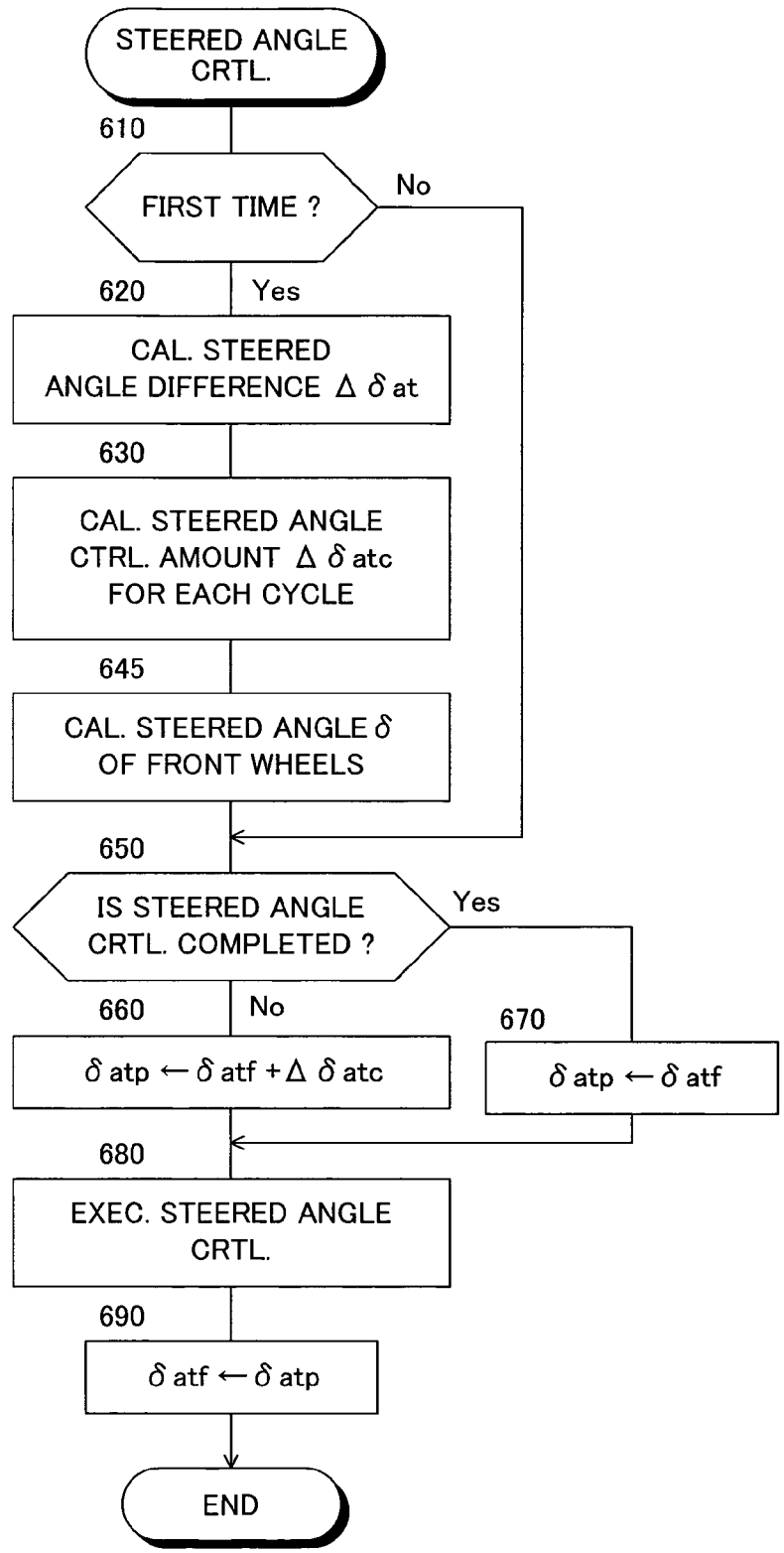
FIG. 14 is a flowchart showing the routine for controlling a steered angle of the front wheels in the fifth embodiment.

In step 600 in the fifth embodiment, steered angle control of the front wheels for the trajectory control is executed according to the flowchart shown in FIG. 14.

While steps 610-630 and step 650 in the flowchart shown in FIG. 14 are executed substantially in the same manner as in the above-mentioned first embodiment, step corresponding to step 640 in the first embodiment is not conducted.

In step 645 conducted next to step 630, steered angle δ of the front wheels is calculated on the basis of rotation angle θp of the pinion shaft 88 at a time point of initiation or renewal of the trajectory control and the steered angle is set to a previous cycle steered angle δatf of the front wheels for the undementioned step 660.

When a negative decision is made in step 650, in step 660, present cycle target steered angle δatp of the front wheels is set to a sum of the previous cycle steered angle δatf and steered angle control amount Δδatc calculated in step 630. To the contrary, when an affirmative decision is made in step 650, in step 670, present cycle target steered angle δatp of the front wheels is set to the previous cycle steered angle δatf.

In step 680, the electric motor 94 of the steering device 96 is controlled so that the steered angle of the front wheels conforms to present cycle target steered angle δatp of the front wheels.

In step 690, the present cycle target steered angle δatp of the front wheels is set to a previous cycle steered angle δatf of the front wheels for the next cycle.

Accordingly, in the fifth embodiment, the steered angle control of the front wheels for driving the vehicle along a target arc trajectory Tc is achieved in a feed-forward manner, whereby the vehicle travels along a target arc trajectory.

Therefore, according to the fifth embodiment, under the situation where the trajectory control is to be executed, it is possible to control steered angle of the front wheels to target steered angle δat, which enables to control traveling trajectory of the vehicle so that the vehicle travels along the target arc trajectory without requiring steering operation by a driver.

According to the fifth embodiment, in particular, the steered angle control of the front wheels is the feed-forward control executed on the basis of steered angle δ of the front wheels at a time point of initiation or renewal of the trajectory control. When the steered angle of the front wheels on the basis of the difference Δδat is completed, the steered angle control of the front wheels for the trajectory control is not executed until the trajectory control is terminated or renewed. Accordingly, trajectory control in which the target trajectory is arc can be simply executed as compare with the case where, as in a sixth embodiment described later, the steered angle control of the front wheels is a feed-back control and the steered angle control of the front wheels is to be detected in each cycle.

Figure 15:
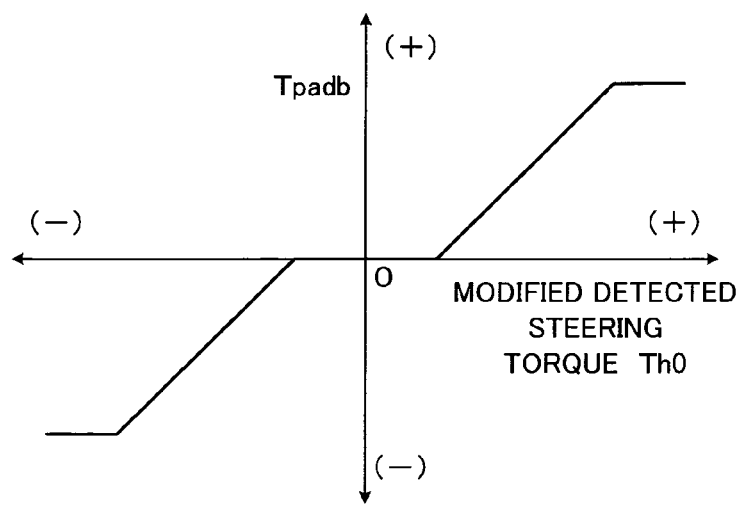
FIG. 15 is a graph showing the relationship between steering torque after modification Th0 and basic assist torque Tpadb for alleviating steering load.
Figure 16:
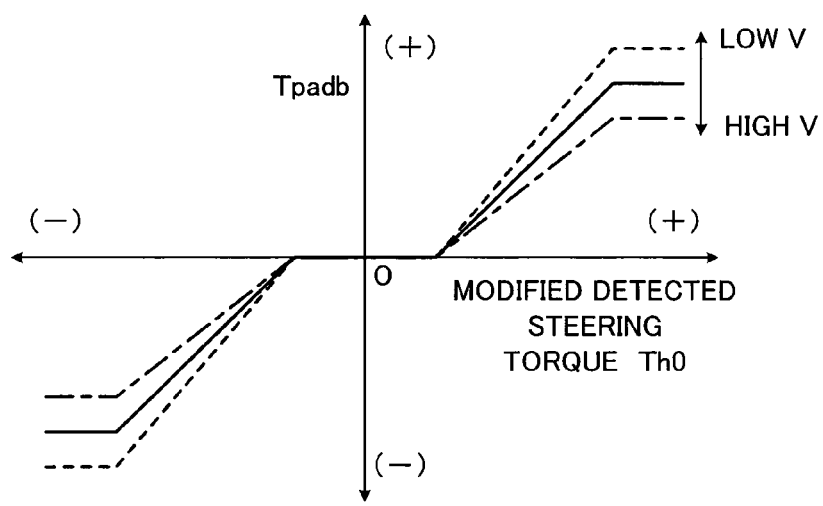
FIG. 16 is a graph showing the relationship among steering torque after modification Th0, vehicle speed V and basic assist torque Tpadb for alleviating steering load.

In step 900 corresponding to step 800 in the first to fourth embodiments, steering torque which a driver feels as steering reaction force is controlled. First, a modified detected steering torque Th0 is calculated according to the above-mentioned equation 72 on the basis of steering angle θ. A basic assist torque Tpadb for alleviating steering load is calculated from a map corresponding to the graph shown in FIG. 15 on the basis of the modified detected steering torque Th0. A vehicle speed coefficient Kv is calculated from a map corresponding to the graph shown in FIG. 8 on the basis of vehicle speed V. A steering load alleviating torque Tpad is calculated to a product of the basic assist torque Tpadb for alleviating steering load and the vehicle speed coefficient Kv. It is to be noted that steering load alleviating torque Tpad may be calculated from a map corresponding to the graph shown in FIG. 16.

In addition, a target assist torque Tpbt is calculated according to the above-mentioned equation 79 on the basis of the modified detected steering torque Th0 and the steering load alleviating torque Tpad and the electric motor 90 of the steering device 96 is controlled so that the steering torque conforms to the target steering torque Tpbt.

It is to be understood that steering torque control by the control of the electric motor 90 is executed in the same way in a sixth to eighth embodiments described later. That is, in steered angle control devices of by-wire type, steering torque control is executed in the same manner irrespective of whether or not target trajectory is arc and whether or not steered angle control is executed in a feed-forward manner.

Sixth Embodiment

As shown in the above-mentioned Table 2, the sixth embodiment has the following characteristics.
Steered angle control device: By-wire type
Target trajectory: Arc
Steered angle control: Feed-back
Steering reaction force control: Steering reaction force control of non mechanical steered angle control device While the vehicle travel control in the sixth embodiment is executed substantially in the same manner as in the above-mentioned fifth embodiment, in the steered angle control in step 600, the steered angle of the front wheels is controlled in a feed-back manner.

That is, present steered angle δ of the front wheels is obtained in each cycle on the basis of rotation angle θp of the pinion shaft 88, and a difference Δδat between target steered angle δat of the front wheels and present steered angle δ is calculated. The electric motor 94 of the steering device 96 is controlled so that the magnitude of the steered angle difference Δδat decreases. Accordingly, steered angle of the front wheels can be controlled to target steered angle δat in a feed-back manner and the vehicle travels along the target arc trajectory.

Therefore, according to the sixth embodiment, under the situation where the trajectory control is to be executed, it is possible to control steered angle of the front wheels to target steered angle δat, which enables to control traveling trajectory of the vehicle so that the vehicle travels along the target arc trajectory with or without steering operation by a driver.

According to the sixth embodiment, in particular, a steered angle difference Δδat is calculated in each cycle as a difference between target steered angle δat of the front wheels and present steered angle δ. Accordingly, steered angle of the front wheels can be accurately controlled to target steered angle δat as compare with the fifth embodiment where the steered angle of the front wheels is controlled in a feed-forward manner.

Seventh Embodiment

Figure 17:
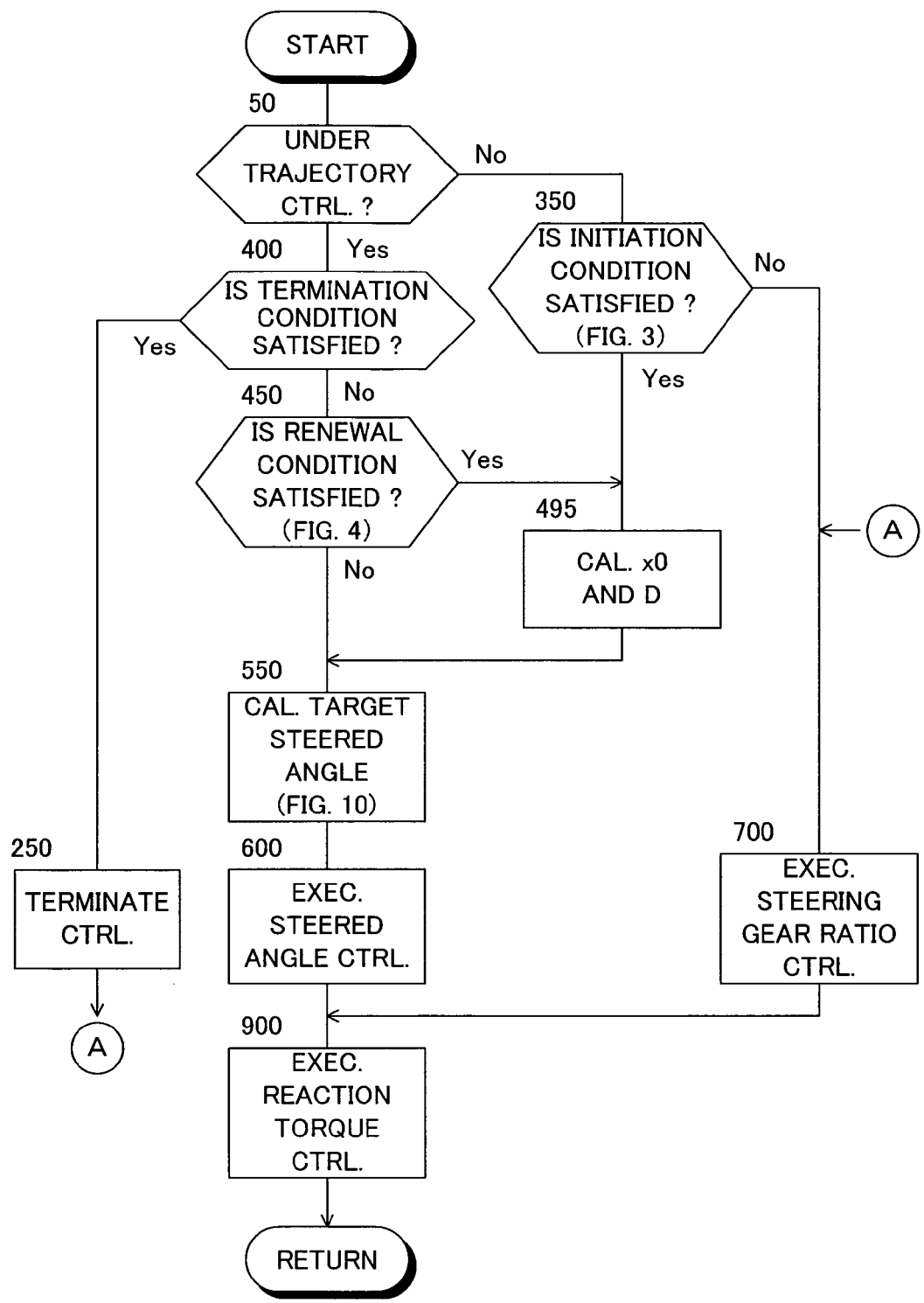
FIG. 17 is a flowchart showing the routine for controlling a steered angle of the front wheels in a seventh embodiment.
Figure 18:
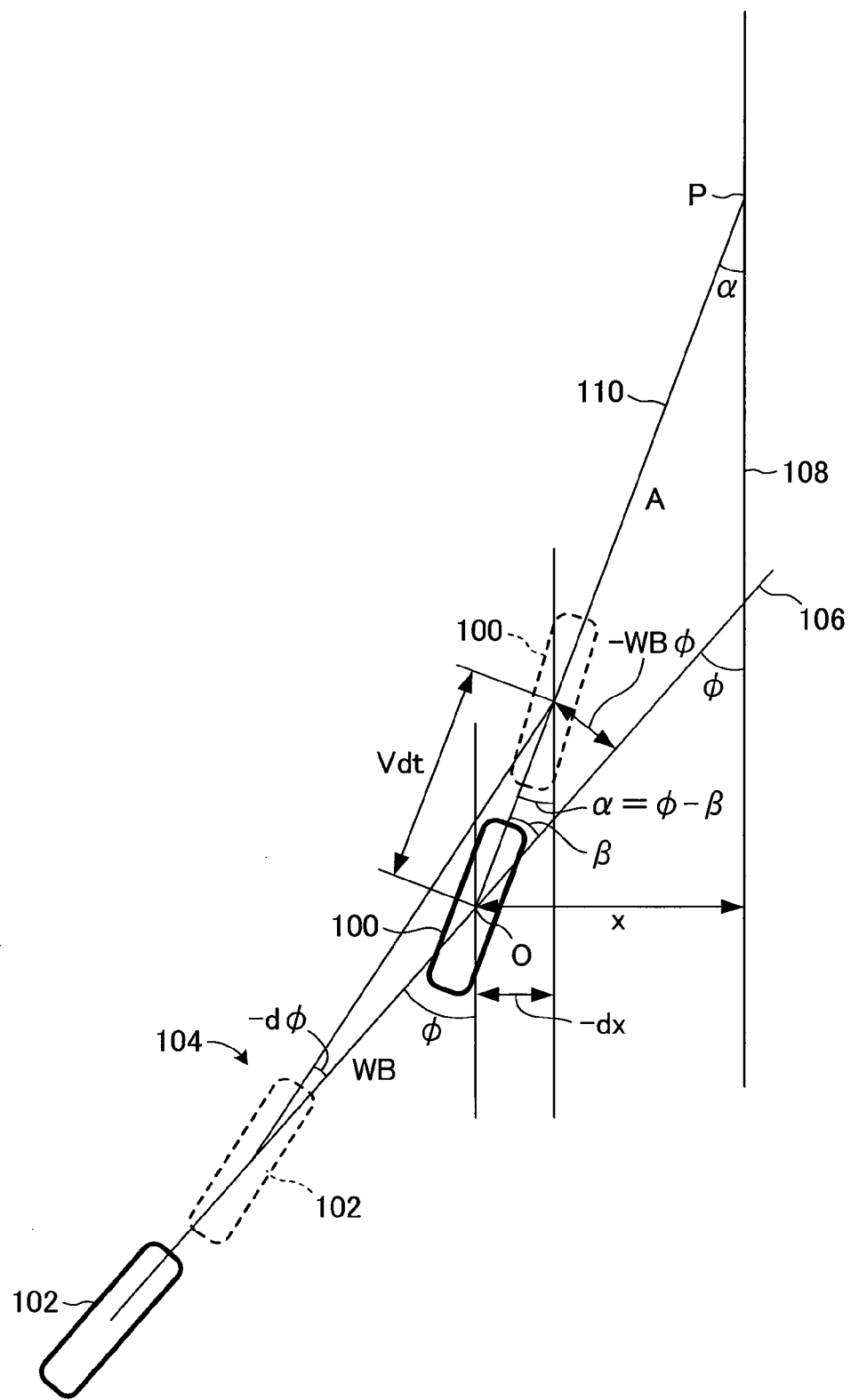
FIG. 18 is an explanatory view showing a situation where a vehicle of two-wheel model changes its course.

As shown in the above-mentioned Table 2, the seventh embodiment has the following characteristics.
Steered angle control device: By-wire type
Target trajectory: Exponential
Steered angle control: Feed-forward
Steering reaction force control: Steering reaction force control of non mechanical steered angle control device As shown in FIG. 17, the vehicle travel control in the seventh embodiment is executed substantially in the same manner as in the above-mentioned fifth embodiment. However, when affirmative decisions are made in step 350 and 450, in step 495, steered angle δ of the front wheels is calculated on the basis of rotation angle θp of the pinion shaft 88 and distance xo is calculated according to the above-mentioned equation 46 on the basis of steered angle δ of the front wheels and vehicle speed V. As in the above-mentioned third embodiment, in step 495, correction coefficient D is calculated according to the above-mentioned equation 42 in which minimum time ΔT and k of Weber ratio are positive constants previously set for a general driver.

In the seventh embodiment, in step 550, a target steered angle δbt of the front wheels is calculated which is for driving the vehicle along the target exponential trajectory Te according to the flowchart shown in FIG. 11, i.e. in steps 555-580.

In step 600 in the seventh embodiment, steered angle of the front wheels is controlled in a feed-forward manner in each cycle with a target being set to target steered angle δbt of the front wheels. That is, the electric motors 94 of the steering unit 96 is controlled in each cycle according to a difference between present target steered angle δbt of the front wheels and previous cycle target steered angle δbt of the front wheels. Accordingly, steered angle of the front wheels can be controlled to target steered angle δbt in a feed-forward manner and the vehicle travels along the target exponential trajectory.

It is to be noted that "previous cycle target steered angle δbt of the front wheels" at a time point of initiation or renewal of the trajectory control is set to steered angle δ of the front wheels which is obtained on the basis of rotation angle θp of the pinion shaft 88 at a time point of initiation or renewal of the trajectory control.

Therefore, according to the seventh embodiment, under the situation where the trajectory control is to be executed, it is possible to control steered angle of the front wheels to target steered angle δbt, which enables to control traveling trajectory of the vehicle so that the vehicle travels along the target exponential trajectory without requiring steering operation by a driver.

According to the seventh embodiment, in particular, as in the fifth embodiment, the steered angle control of the front wheels is the feed-forward control executed on the basis of steered angle at a time point of initiation or renewal of the trajectory control. Accordingly, trajectory control in which the target trajectory is exponential can be simply executed as compare with the case where, as in a eighth embodiment described later, the steered angle control of the front wheels is the feed-back control and the steered angle of the front wheels is to be detected in each cycle.

Eighth Embodiment

As shown in the above-mentioned Table 2, the eighth embodiment has the following characteristics.
Steered angle control device: By-wire type
Target trajectory: Exponential
Steered angle control: Feed-back
Steering reaction force control: Steering reaction force control of non mechanical steered angle control device While the vehicle travel control in the eighth embodiment is executed substantially in the same manner as in the above-mentioned seventh embodiment, in the steered angle control in step 600, the steered angle of the front wheels is controlled in a feed-back manner.

That is, present steered angle $\delta$ of the front wheels is obtained in each cycle on the basis of steering angle $\theta$ and relative rotation angle $\theta re$. The electric motor 94 of the steering device 96 is controlled according to a difference between target steered angle $\delta bt$ of the front wheels and present steered angle $\delta$, whereby steered angle of the front wheels is controlled to target steered angle $\delta bt$. Accordingly, steered angle of the front wheels can be controlled to target steered angle $\delta bt$ in a feed-back manner and the vehicle travels along the target exponential trajectory.

Therefore, according to the eighth embodiment, under the situation where the trajectory control is to be executed, it is possible to control steered angle of the front wheels to target steered angle $\delta bt$, which enables to control traveling trajectory of the vehicle so that the vehicle travels along the target exponential trajectory with or without steering operation by a driver.

According to the eighth embodiment, in particular, steered angle of the front wheels is controlled in each cycle on the basis of a difference between target steered angle $\delta bt$ and present steered angle $\delta$. Accordingly, steered angle of the front wheels can be accurately controlled to target steered angle $\delta bt$ as compare with the seventh embodiment where the steered angle of the front wheels is controlled in a feed-forward manner.

According to the above-mentioned fifth to eighth embodiments, modified detected steering torque Th0 is calculated as a value corresponding to steering torque under the situation where steered angle control device is of semi-by-wire type and steered angle of the front wheels is not controlled by the steered angle control device. A steering load alleviating torque Tpad is calculated on the basis of modified detected steering torque Th0 and vehicle speed V. In addition, a target assist torque Tpbt is calculated to a value in which modified detected steering torque Th0 is subtracted by steering load alleviating torque Tpad and the electric motor 90 of the steering device 96 is controlled so that the steering torque conforms to the target steering torque Tpbt.

Therefore, proper degree of steering load can not only be imparted to a driver, but also the change of steering torque due to steered angle control in the trajectory control can be canceled, which enables to effectively prevent the driver from feeling odd for the reason of steering torque change due to the trajectory control.

As apparent from the above, according to the above-mentioned embodiments, a vehicle can be driven along a trajectory which a driver expects without acquiring vehicle exterior information for determining target trajectory and actual trajectory of the vehicle.

According to the above-mentioned first, second, fifth and sixth embodiments, since target trajectory is arc, required calculation amount can be reduced and trajectory control can be executed more easily as compared with a case where target trajectory is exponential.

According to the above-mentioned third, fourth, seventh and eighth embodiments, since target trajectory is exponential, vehicle trajectory can be controlled to more preferable trajectory for passengers as compared with a case where target trajectory is arc. According to these embodiments, in particular, target exponential trajectory is set so that distance x varied according to the above-mentioned equation 40. Accordingly, a trajectory more suitable for perceptual property of human being can be achieved as compared with a case where target trajectory is arc.

While the present invention has been described in detail with reference to the above particular embodiments, it will be apparent to those skilled in the art that the present invention is not limited thereto, but may be embodied in various other forms without departing from the scope of the invention.

For example, a guide rod is deemed to elongate in a backward and forward direction of front wheels, elongation direction of the guide rod relative to the backward and forward direction of front wheels may be a direction different from the backward and forward direction of front wheels so long as it is set on the basis of steering operation amount of a driver. For example, an inclination angle of the guide rod may be set to a product of steered angle $\delta$ of the front wheels and a direction modification coefficient Kd.

In the above-described embodiments, the vehicle travel control includes steered angle control of the front wheels and steering torque control, the latter can be executed in any manner. For example, while in the above-mentioned first to fourth embodiments, steering torque is controlled by the second method control, it may be controlled by the above-mentioned first method control.

In the embodiments, steered angle of the front wheels is controlled in a feed-forward or feed-back manner, it may be controlled by a sum of a gain multiplied feed-forward control amount and a gain multiplied feed-back control amount.

In the above-described first to fourth embodiments, when abnormality arises in any sensor such as steering angle sensor 50 under the situation where steered angle control for the trajectory control is executed, alternative steered angle control is executed utilizing an alternative detecting means. However, in the case where abnormality has been caused in any sensor such as steering angle sensor 50 when steered angle control for the trajectory control is initiated, alternative steered angle control may be started at a time when steered angle control for the trajectory control is initiated. Even if abnormality arises in any sensor such as steering angle sensor 50, alternative steered angle control may not be executed.

Again in the above-described first to fourth embodiments, since the trajectory control by steered angle control is not executed when alternative steered angle control cannot be conducted, inaccurate trajectory control can be prevented from being executed. However, according to the degree of abnormality, by reducing control amount for trajectory control and conducting steered angle control, trajectory control may be executed with steered angle control amount which is reduced than usual.

In the above-described fifth to eighth embodiments, alternative steered angle control is not executed. However, when abnormality arises in rotation angle sensor 96 but rotation angle θp of the pinion shaft 88 can be estimated from the rotation angle of the electric motor 94, alternative steered angle control may be executed utilizing rotation angle θp.

While in the above-described first to fifth embodiments, control amounts of steered angle in respective cycles are set to the same value, they may be set to different values in respective cycles.

The invention claimed is:

1. A vehicle travel control device comprising:
 a steered angle control device configured to change a relationship of a steered angle of steerable wheels to a steering operation amount by a driver; and
 a control unit configured to control the steered angle of the steerable wheels by said steered angle control device, wherein
 said control unit is configured to
 follow a predetermined procedure to decide whether or not a condition for initiating or renewing vehicle trajectory control is satisfied, and
 when an affirmative decision is made that said condition is satisfied, determine a target arrival position and drive a target trajectory which is required for the vehicle to arrive at said target arrival position in a target traveling direction and extends from a position of the vehicle at a time point of the affirmative decision to said target arrival position on the basis of a steering operation amount by the driver and a vehicle speed at the time point of the affirmative decision, calculate a target steered angle of the steerable wheels for driving the vehicle along said target trajectory, and control the steered angle of the steerable wheels by said steered angle control device according to said target steered angle,
 said target traveling direction is determined on the basis of the steering operation amount by the driver at said time point, and
 with an angle which is determined on the basis of the steering operation amount by the driver at said time point being a reference angle, said target arrival position is on a straight line which is dropped from a position of the vehicle at said time point in a direction inclined at said reference angle relative to a longitudinal direction of the vehicle and a distance from the position of the vehicle at said time point to said target arrival position is a value which is dependent on vehicle speed.

2. A vehicle travel control device according to claim 1, wherein said target trajectory is an exponential curve having an exponent including a variable of elapsed time since said time point on a hypothetical orthogonal coordinates having a time-related coordinate which is a straight line indicating said target traveling direction and a distance-related coordinate which is a perpendicular line dropped from a vehicle position at said time point to said time-related coordinate.

3. A vehicle travel control device according to claim 1, wherein said target trajectory is an arc curve which has contact with a straight line indicating longitudinal direction of the vehicle at said time point at a position of the vehicle at said time point and has contact with a straight line indicating said target traveling direction at said target arrival position.

4. A vehicle travel control device according to claim 1, wherein said control unit is configured to modify the steered angle of the steerable wheels so that a difference between the steered angle of the steerable wheels at said time point and said target steered angle decreases.

5. A vehicle travel control device according to claim 1, wherein said control unit is configured to modify the steered angle of the steerable wheels so that a difference between an actual steered angle of the steerable wheels and said target steered angle decreases.

6. A vehicle travel control device according to claim 1, wherein with a straight line connecting the position of the vehicle at said time point and said target arrival position being a direction reference line, said target traveling direction is determined to a direction which is inclined at said reference angle relative to a direction reference line at said target arrival position.

7. A vehicle travel control device according to claim 1, wherein said control unit is configured to decide that vehicle trajectory control is to be initiated when a magnitude of a change rate of the steering operation amount by the driver becomes lower than a second reference value for control initiation decision after the magnitude of change rate of the steering operation amount by the driver exceeded a first reference value for control initiation decision under a situation where said trajectory control is not executed.

8. A vehicle travel control device according to claim 1, wherein said control unit is configured to decide that vehicle trajectory control is to be renewed when a magnitude of a change rate of the steering operation amount by the driver becomes lower than a second reference value for control initiation decision after the magnitude of change rate of the steering operation amount by the driver exceeded a first reference value for control initiation decision under a situation where said trajectory control is executed.

9. A vehicle travel control device according to claim 2, wherein with a distance from the position of the vehicle at said time point to said time-related coordinate being a reference distance, a target distance is calculated to a product of said reference distance and a natural exponential including a variable of elapsed time since said time point and said target trajectory is determined as a line connecting points which are at target distances from said time-related coordinate.

10. A vehicle travel control device according to claim 9, wherein with a general time being represented by $\Delta T$ which is necessary for a person to perceive a change of vehicle exterior visual information relevant to necessity of the steering operation after the change occurred; Weber ratio being represented by $-k$; and a elapsed time since said time point being represented by t, the exponent of said natural exponential is $-(k/\Delta T)t$.

11. A vehicle travel control device according to claim 1, wherein
 said steered angle control device is of semi-by-wire type having a steering transfer ratio varying unit which modifies the steered angle of the steerable wheels by virtue of actuating the steerable wheels relative to a steering input unit operated by the driver, and
 said control unit is configured to control said steering transfer ratio varying unit.

12. A vehicle travel control device according to claim 11, wherein
 the vehicle has
 a steering assist force generation unit configured to generate steering assist force for assisting the steering operation by the driver, and a steering assist force control unit configured to control said steering assist force generation unit according to a target steering assist force for alleviating steering load of the driver, and said steering assist force control unit is configured to, under a situation where said trajectory control is executed, estimate an amount of steering force change due to the control of the steered angle of the steerable wheels by said steered angle control device; correct detected steering force with said amount of steering force change; calculate a steering assist force necessary to alleviate steering load of the driver on the basis of the corrected steering force; and set said target steering assist force to a sum of said necessary steering assist force and said amount of steering force change.

13. A vehicle travel control device according to claim 1, wherein said steered angle control device is of by-wire type having
a wheel-steer-drive unit configured to vary steered angle of the steerable wheels, and
a detection unit configured to detect the steering operation amount to a steering input unit by the driver, and said control unit is configured to control said wheel-steer-drive unit according to a steering operation amount by the driver under a normal situation and controlling said wheel-steer-drive unit as necessary independently of the steering operation by the driver.

14. A vehicle travel control device according to claim 13, wherein the vehicle has
a steering reaction force generation unit configured to generate steering reaction force, and
a steering reaction force control unit configured to control said steering reaction force generation unit according to a target steering reaction force, and said steering reaction force control unit is configured to calculate a basic steering reaction force which is not influenced by steered angle control of the steerable wheels by said steered angle control device on the basis of the steering operation amount by the driver and calculate a target steering reaction force on the basis of a value which is derived by subtracting a basic steering force reducing amount for alleviating steering load of the driver from said basic steering reaction force.

15. A vehicle travel control device according to claim 1, wherein said control unit is configured to restrain said trajectory control when at least one of said steered angle control device and a unit configured to attain the steering operation amount by the driver is not normal.

* * * * *